US010228285B2

United States Patent
Gomi

(10) Patent No.: US 10,228,285 B2
(45) Date of Patent: Mar. 12, 2019

(54) MEASURING DEVICE AND MEASURING METHOD

(71) Applicant: Seiko Epson Corporation, Tokyo (JP)

(72) Inventor: Tsugio Gomi, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/714,016

(22) Filed: Sep. 25, 2017

(65) Prior Publication Data

US 2018/0087966 A1 Mar. 29, 2018

(30) Foreign Application Priority Data

Sep. 29, 2016 (JP) .................................. 2016-190768

(51) Int. Cl.
| | |
|---|---|
| *G01J 3/46* | (2006.01) |
| *B41F 33/00* | (2006.01) |
| *G01J 3/26* | (2006.01) |
| *G01J 3/50* | (2006.01) |
| *G01J 3/52* | (2006.01) |

(52) U.S. Cl.
CPC ............ *G01J 3/46* (2013.01); *B41F 33/0036* (2013.01); *G01J 3/26* (2013.01); *G01J 3/50* (2013.01); *G01J 3/524* (2013.01)

(58) Field of Classification Search
CPC ........ G01J 3/46; G01J 3/26; G01J 3/50; G01J 3/524; G01J 3/02; B41F 33/00; H04N 1/60; H04N 1/23; H04N 1/52
See application file for complete search history.

(56) References Cited

U.S. PATENT DOCUMENTS

2011/0255105 A1* 10/2011 Hatori ...................... G01J 3/02
358/1.9

FOREIGN PATENT DOCUMENTS

JP 2005-059552 A 3/2005

* cited by examiner

*Primary Examiner* — Abdullahi Nur

(74) *Attorney, Agent, or Firm* — Harness, Dickey & Pierce, P.L.C.

(57) ABSTRACT

A measuring device is a measuring device that performs colorimetry of an evaluation patch formed on a medium and a paper white patch that is a portion exposed by the medium. The measuring device has a light source portion that irradiates the medium with an illumination light, a measurement portion that acquires an amount of light from the medium as a measurement value, a memory that holds a paper white standard value that is a reference measurement value of the paper white patch, and a colorimetry unit that corrects a measurement value of the evaluation patch based on the measurement value of the paper white patch and the paper white standard value. Even in a case where a measurement position is changed, a reflectance of the evaluation patch is accurately calculated and a chromaticity of the evaluation patch can be accurately acquired.

9 Claims, 12 Drawing Sheets

MEASURING DEVICE AND MEASURING METHOD

BACKGROUND

1. Technical Field

The present invention relates to a measuring device and a measuring method of the measuring device.

2. Related Art

In the related art, in an image forming apparatus such as a printer, there is known an apparatus including a measuring device that measures a color of a measuring object (for example, see JP-A-2005-59552).

An apparatus described in JP-A-2005-59552 includes a light source that irradiates illumination light to the measuring object and measures light reflected by the light source using a measuring device. In the apparatus described in JP-A-2005-59552, a focal position of the illumination light is set behind (side opposite to the measuring device) the measuring object. In this case, even in a case where undulation (cockling) or the like occurs due to, for example, an influence of humidity or temperature, or an action of a physical external force, an amount of change in light intensity of the light received by the measuring device is reduced and it is possible to suppress reduction of measurement accuracy.

Meanwhile, usually, in a case where colorimetry is performed by the measuring device, the colorimetry is performed according to geometric conditions defined by a colorimetric standard (JIS Z 8722), that is, the measuring object is irradiated with the illumination light at 45 degrees and a reflected light reflected at 90 degrees is measured by the measuring device (45/0° colorimetric system), or the measuring object is irradiated with the illumination light at 90 degrees and the reflected light reflected by 45 degrees is measured by the measuring device (0/45° colorimetric system).

However, for example, in a case where cockling or the like occurs in the measuring object and a position of the measuring object is changed, a distance between the measuring object, the measuring device, and the light source is changed, and a position of an illumination region where the measuring object is irradiated with the illumination light or a measuring region which is capable of being measured by the measuring device is changed. Therefore, an amount of the illumination light in an overlapping portion between the measuring region and the illumination region is changed. Therefore, there is a problem that the amount of the measuring light incident on the measuring device is also changed and it is difficult to perform colorimetry with high accuracy.

SUMMARY

An advantage of some aspects of the invention is to solve at least a part of the problems described above, and the invention can be implemented as the following forms or application examples.

A measuring device according to an aspect of the invention is a measuring device that measures colors of an evaluation patch formed in a measuring object and a paper white patch which is a portion exposed by the measuring object, the device including a light source that irradiates the measuring object with an illumination light; a measurement portion that acquires an amount of light from the measuring object as a measurement value; a storage portion that holds a paper white standard value that is a reference measurement value of the paper white patch; and a correction portion that corrects a measurement value of the evaluation patch based on a measurement value of the paper white patch and the paper white standard value.

Application Example 1

A measuring device according to this application example is a measuring device that measures colors of an evaluation patch formed in a measuring object and a paper white patch which is a portion exposed by the measuring object, the device including a light source that irradiates the measuring object with an illumination light; a measurement portion that acquires an amount of a reflected light which is acquired by reflecting the illumination light by the measuring object as a measurement value; a storage portion that holds a paper white standard value that is a reference measurement value of the paper white patch; and a correction portion that corrects a measurement value of the evaluation patch based on a measurement value of the paper white patch and the paper white standard value.

For example, in a case where cockling or the like occurs in the measuring object and a distance between the light source, the measurement portion, and the evaluation patch, that is, a position (hereinafter, referred to as a measurement position) of the evaluation patch with respect to the light source and the measurement portion is changed, the amount (hereinafter, referred to as an amount of received light) of the illumination light with which the measuring object is irradiated is changed and it is difficult to perform colorimetry with high accuracy.

If the paper white patch is disposed close to the evaluation patch and the position (hereinafter, referred to as a measurement position of the paper white patch) of the paper white patch with respect to the light source and the measurement portion, and the measurement position of the evaluation patch are made the same, the amount of the received light is the same for the paper white patch and the evaluation patch, and a difference in the amount of received light in a case where the measurement position is changed is the same for the evaluation patch and the paper white patch. Therefore, if the measurement value of the evaluation patch is corrected by the difference in the amount of received light of the paper white patch in a case where the measurement position is changed, an influence of the difference in the amount of received light of the evaluation patch in a case where the measurement position is changed is reduced and it is possible to perform colorimetry with high accuracy.

For example, the difference in the amount of received light of the paper white patch in a case where the measurement position is changed can be represented by a colorimetric result (measurement value of the paper white patch) of the paper white patch in the measurement position and a colorimetric value of a reference medium (for example, a standard white plate) in a reference measurement position. However, if the measurement value of the evaluation patch is corrected by the measurement value of the paper white patch and the colorimetric value of the reference medium, a difference in color tone between the paper white patch (that is, the measuring object) and the reference medium is affected and it is difficult to properly correct the evaluation patch.

On the other hand, if the difference in the amount of received light of the paper white patch in a case where the measurement position is changed is represented only by the paper white patch, it is possible to correct the measurement value of the evaluation patch without receiving the influence of the color tone of the paper white patch (that is, the measuring object). Specifically, if the difference in the amount of received light of the paper white patch in a case where the measurement position is changed is represented by the colorimetric result (measurement value of the paper white patch) of the paper white patch in the measurement position and the measurement value (paper white standard value) of the paper white patch in the reference measurement position, and the measurement value of the evaluation patch is corrected by the measurement value of the paper white patch and the paper white standard value, there is no influence of the color tone of the paper white patch and it is possible to properly correct the evaluation patch.

Therefore, the correction portion corrects the measurement value of the evaluation patch based on the measurement value of the paper white patch and the paper white standard value so that the influence of a case where the measurement position of the evaluation patch is changed is reduced, and, for example, even in a case where the measurement position of the evaluation patch is changed by cockling or the like in the measuring object, it is possible to perform colorimetry with high accuracy.

Application Example 2

In the measuring device according to the application example, it is preferable that the measuring device further includes a standard white plate, the storage portion further holds a standard white value that is a reference measurement value of the standard white plate, and the correction portion corrects a measurement value of the evaluation patch based on a measurement value of the standard white plate and the standard white value.

For example, if the light source or the measurement portion changes with time, and the amount of the illumination light irradiated from the light source, or sensitivity of the measurement portion is changed, it is difficult to perform colorimetry with high accuracy. The change in the light source or the measurement portion with time can be represented by a relative value on the basis of the standard white value based on the measurement value of the standard white plate and the standard white value that is the reference measurement value of the standard white plate.

Therefore, the correction portion corrects the measurement value of the evaluation patch based on the measurement value of the standard white plate and the standard white value that is the reference measurement value of the standard white plate so that the influence of a case where the light source or the measurement portion is changed with time is reduced. Therefore, even in a case where the light source or the measurement position is changed with time, it is possible to perform colorimetry with high accuracy.

Application Example 3

In the measuring device according to the application example, it is preferable that the measuring device further includes a carriage on which the light source and the measurement portion are mounted, and which is movable relative to the measuring object, and the measurement value of the paper white patch and the measurement value of the evaluation patch are acquired while the carriage moves relative to the measuring object.

Since the light source and the measurement portion are moved relative to the measuring object together with the carriage, it is possible to efficiently perform colorimetry of the evaluation patch or the paper white patch formed on the measuring object compared to a case where the light source, the measurement portion, and the carriage are separately moved relative to the measuring object.

Application Example 4

In the measuring device according to the application example, it is preferable that the measurement portion has a spectroscope and the spectroscope is a transmissive wavelength variable Fabry-Perot etalon.

As the spectroscope, if the transmissive wavelength variable Fabry-Perot etalon is used, it is possible to acquire a simple, compact, and inexpensive spectroscope.

Application Example 5

In the measuring device according to the application example, it is preferable that the storage portion holds the paper white standard value for each type of the measuring object.

Since the paper white standard value that is the reference measurement value of the paper white patch is different for each type of the measuring object, it is preferable that the paper white standard value is held in the storage portion for each type of the measuring object.

Application Example 6

In the measuring device according to the application example, it is preferable that the measuring object has a plurality of paper white patches, and the correction portion corrects the measurement value of the evaluation patch using the measurement value of the paper white patch positioned at a position close to the evaluation patch among the plurality of paper white patches.

If the paper white patch is positioned at a position away from the evaluation patch, in a case where cockling or the like occurs in the measuring object, the measurement positions in the paper white patch and the evaluation patch are different and there is a concern that the amount of received light in the paper white patch and the amount of received light in the evaluation patch are different. Therefore, there is a concern that it is difficult for the correction portion to perform correction for reducing the influence of a case where the measurement position of the evaluation patch is changed by the measurement value of the paper white patch that is at a position away from the evaluation patch.

If the paper white patch is positioned at a position close to the evaluation patch, in a case where cockling or the like occurs in the measuring object, the measurement positions in the paper white patch and the evaluation patch are the same, and the amount of received light in the paper white patch and the amount of received light of the evaluation patch are substantially the same. Therefore, the correction portion can properly perform the correction for reducing the influence of a case where the measurement position of the evaluation patch is changed by the measurement value of the paper white patch that is at a position close to the evaluation patch.

That is, it is preferable that the correction portion corrects the measurement value of the evaluation patch using not the measurement value of the paper white patch positioned at a position away from the evaluation patch among the plurality of paper white patches but the measurement value of the paper white patch positioned at a position close to the evaluation patch among the plurality of paper white patches.

Application Example 7

In the measuring device according to the application example, it is preferable that in a case where the plurality of paper white patches are present at positions close to the evaluation patch, the correction portion corrects the measurement value of the evaluation patch using an average value of the measurement values of the plurality of paper white patches at positions close to the evaluation patch.

In a case where the plurality of paper white patches are present at the positions close to the evaluation patch, if the average value of the measurement values of the plurality of paper white patches which are positioned at the positions close to the evaluation patch is used, it is possible to faithfully monitor the influence of a case where the measurement position of the evaluation patch is changed.

Application Example 8

A measuring method according to this application example is a measuring method of a measuring device having a light source that irradiates a measuring object having an evaluation patch and a paper white patch with an illumination light, a measurement portion that acquires an amount of the illumination light reflected by the measuring object as a measurement value, a carriage on which the light source and the measurement portion are mounted, and which is movable relative to the measuring object, a storage portion that holds a paper white standard value, and a correction portion that corrects a measurement value of the evaluation patch, the method including acquiring a measurement value of the evaluation patch while the carriage moves relative to the measuring object; acquiring a measurement value of the paper white patch while the carriage moves relative to the measuring object; and correcting a measurement value of the evaluation patch based on the measurement value of the paper white patch and the paper white standard value.

If the light source and the measurement portion are moved relative to the measuring object together with the carriage, it is possible to efficiently acquire the measurement value of the evaluation patch and the measurement value of the paper white patch compared to a case where the light source, the measurement portion, and the carriage are separately moved relative to the measuring object.

Furthermore, the correction portion performs correction based on the measurement value of the paper white patch and the paper white standard value so that the influence of a case where the measurement position of the evaluation patch is changed is reduced, and it is possible to perform colorimetry with high accuracy.

Application Example 9

In the measuring method of a measuring device according to the application example, it is preferable that the storage portion further holds a standard white value that is a reference measurement value of a standard white plate, and the method further including acquiring a measurement value of the standard white plate, and correcting a measurement value of the evaluation patch based on the measurement value of the standard white plate and the standard white value.

The correction portion performs correction based on the measurement value of the standard white plate and the standard white value that is the reference measurement value of the standard white plate so that the influence of a case where the light source or the measurement portion is changed with time is reduced, and it is possible to perform colorimetry with high accuracy.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
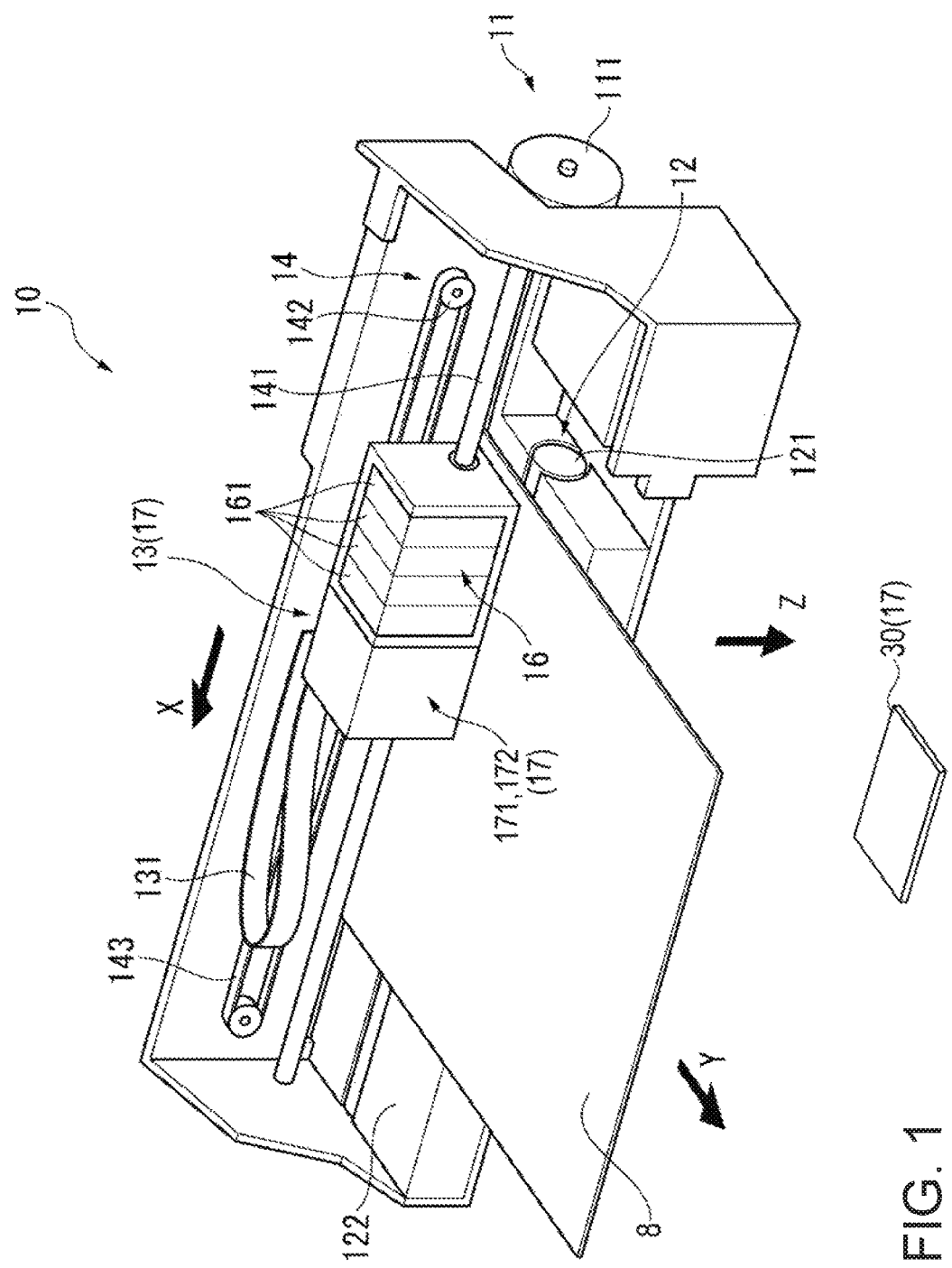
FIG. 1 is a schematic view illustrating an outline of a printer including a measuring device according to an embodiment.

Hereinafter, an embodiment of the invention will be described with reference to the drawings. Such an embodiment illustrates an aspect of the invention, does not limit the invention, and can be arbitrary changed within the scope of the technical idea of the invention. In addition, in each of the following drawings, a scale of each layer or each portion is sometimes different from an actual scale in order to make each layer or each portion size recognizable on the drawing.

Embodiment

Outline of Printer

Figure 2:
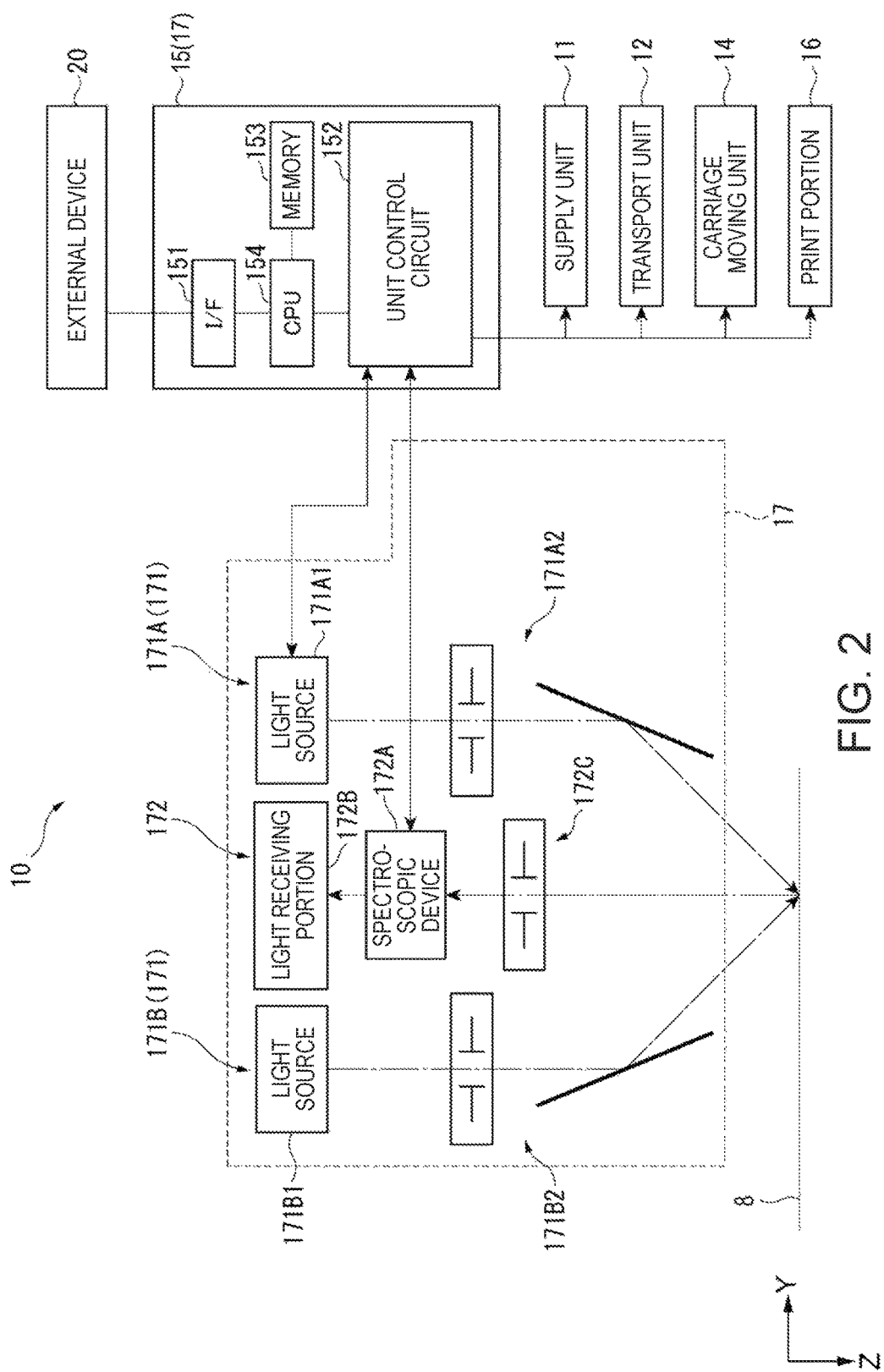
FIG. 2 is a block diagram illustrating a schematic configuration of the printer.
Figure 3:
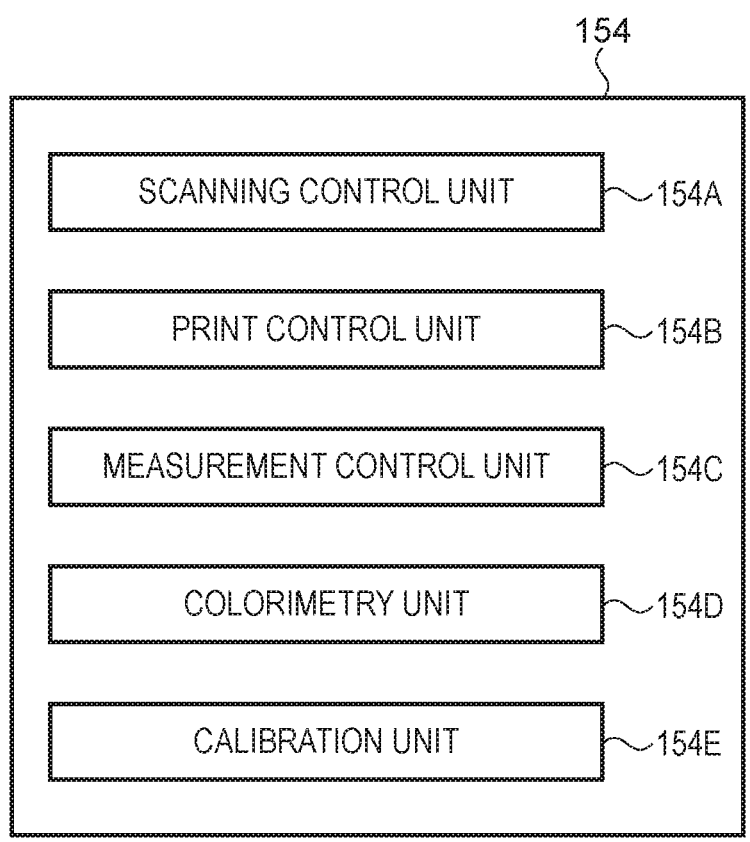
FIG. 3 is block diagram illustrating a functional configuration of a CPU included in a control unit of the printer.

FIG. 1 is a schematic view illustrating an outline of a printer (printing apparatus) including a measuring device according to an embodiment. FIG. 2 is a block diagram illustrating a schematic configuration of the printer. FIG. 3 is block diagram illustrating a functional configuration of a CPU included in a control unit of the printer.

First, an outline of a printer 10 including a measuring device 17 according to the embodiment will be described with reference to FIGS. 1 to 3.

As illustrated in FIG. 1, the printer 10 includes a supply unit 11, a transport unit 12, a carriage 13, a carriage moving unit 14, a light source portion 171, and a measurement portion 172 which are mounted on the carriage 13, a standard white plate 30, and a control unit 15 (see FIG. 2). Moreover, the light source portion 171, the measurement portion 172, the standard white plate 30, and the control unit 15 are also configuration elements of the measuring device 17. That is, the printer 10 includes the measuring device 17.

The printer 10 controls each of the units 11, 12, and 14, and the carriage 13 based on print data input from, for example, an external device 20 (see FIG. 2) such as a personal computer, and prints an image on a medium 8 that is an example of a "measuring object".

Moreover, the light source portion 171 is an example of a "light source". In addition, details of the measuring device 17 will be described below.

The supply unit 11 is a unit that supplies the medium 8 that is an image forming object to an image forming position. The supply unit 11 includes a roll body 111 around which, for example, the medium 8 is wound, a roll drive motor (not illustrated), a roll drive wheel train (not illustrated), and the like. Therefore, the roll drive motor is driven to be rotated based on a command from the control unit 15 and a rotational force of the roll drive motor is transmitted to the roll body 111 via the roll drive wheel train. Therefore, the roll body 111 is rotated and the medium 8 wound around the roll body 111 is supplied in a Y direction (sub-scanning direction).

Any medium may be used as the medium 8, as long as the medium 8 is an image forming object and, for example, plain paper, a copy sheet, synthetic paper, coated paper, and various types of ink jet special paper, a transparent medium such as a PET film, vinyl chloride film, or the like can be exemplified.

Moreover, in the embodiment, an example in which a paper surface wound around the roll body 111 is supplied is illustrated, but the invention is not limited to the example. For example, the medium 8 such as the paper surface mounted on a tray or the like may be supplied by any feeding method such as supplying the medium 8 one by one by a roller or the like.

In addition, in the following description, a direction in which the medium 8 is supplied by the supply unit 11 is referred to as a Y direction, a direction orthogonal to the Y direction is referred to as an X direction (scanning direction), and a vertical direction orthogonal to the X direction and the Y direction is referred to as a Z direction. Furthermore, a base end side of an arrow indicating a direction in the drawing is referred to as a (−) direction and a tip end side of the arrow is referred to as (+) direction.

The transport unit 12 transports the medium 8 supplied from the supply unit 11 along the Y direction. The transport unit 12 is configured to include a transport roller 121, a driven roller (not illustrated) that is driven by the transport roller 121 with the medium 8 interposed between the transport roller 121 and the driven roller, and a platen 122.

If the drive force is transmitted from the transport motor (not illustrated) to the transport roller 121 and the transport motor is driven by the control of the control unit 15, the transport roller 121 is driven to be rotated by the rotational force and transports the medium 8 along the Y direction in a state where the medium 8 is in a pinched state between the transport roller 121 and the driven roller. In addition, the platen 122 facing the carriage 13 is provided in a direction on a downstream side (side on a Y(+) direction) in the Y direction of the transport roller 121.

A print portion 16 that prints an image on the medium 8, the light source portion 171, and the measurement portion 172 are mounted on the carriage 13.

The carriage 13 is provided movably by the carriage moving unit 14 along the scanning direction (X direction) intersecting with the Y direction. In addition, the carriage 13 is connected to the control unit 15 by a flexible circuit 131 and a printing process (image forming process with respect to the medium 8) is performed by the print portion 16 mounted on the carriage 13 based on a command from the control unit 15. As will be described in detail later, the light source portion 171 and the measurement portion 172 perform spectroscopic measurement (colorimetry) while moving relative to the medium 8 together with the carriage 13.

The carriage moving unit 14 causes the carriage 13 to reciprocate in the X direction based on a command from the control unit 15.

The carriage moving unit 14 is configured to include, for example, a carriage guide shaft 141, a carriage motor 142, and a timing belt 143.

The carriage guide shaft 141 is disposed in the X direction and both end portions are fixed to, for example, a casing of the printer 10. The carriage motor 142 drives the timing belt 143. The timing belt 143 is supported substantially parallel to the carriage guide shaft 141 and a part of the carriage 13 is fixed thereto. Therefore, when the carriage motor 142 is driven based on a command of the control unit 15, the timing belt 143 is driven in forward and rearward direction, and the carriage 13 fixed to the timing belt 143 is guided by the carriage guide shaft 141 to reciprocate.

The print portion 16 discharges ink at a portion facing the medium 8 on the medium 8 separately and forms an image on the medium 8. Ink cartridges 161 corresponding to inks of a plurality of colors are detachably mounted on the print portion 16 and ink is supplied from each of the ink cartridges 161 to an ink tank (not illustrated) via a tube (not illustrated). In addition, nozzles (not illustrated) discharging ink droplets are provided on a lower surface (position facing the medium 8) of the print portion 16 corresponding to each color. For example, piezoelectric elements are disposed in the nozzles, the ink droplets supplied from the ink tank are discharged, the ink droplets are landed on the medium 8, and dots are formed by driving the piezoelectric elements.

The ink cartridges 161 are filled with inks of four colors of cyan (C), magenta (M), yellow (Y), and black (K), and the ink droplets of four colors of cyan (C), magenta (M), yellow (Y), and black (K) are discharged from the nozzles.

Moreover, the number of the inks is not limited to four colors and may be less than the four colors, or may be greater than the four colors.

As illustrated in FIG. 2, the control unit 15 is configured to include an I/F 151, a unit control circuit 152, a memory 153, and a Central Processing Unit (CPU) 154.

The I/F 151 inputs print data input from the external device 20 into the CPU 154.

The unit control circuit 152 includes a control circuit that respectively controls the supply unit 11, the transport unit 12, the print portion 16, the light source portion 171, a wavelength variable interference filter 5 (see FIG. 4), the measurement portion 172, and the carriage moving unit 14, and controls an operation of each unit based on a command signal from the CPU 154. Moreover, the control circuit of each unit is provided separately from the control unit 15 and may be connected to the control unit 15.

The memory 153 stores various programs or various types of data for controlling the operation of the printer 10. The memory 153 is an example of the "storage portion" and holds a paper white standard value that is a reference measurement value of paper white patches 72A, 72B, 72C, 72D, and 72E (see FIG. 5) and a standard white value that is a reference measurement value of the standard white plate 30.

In addition, there is a plurality of paper types constituting the medium 8 and the memory 153 holds the paper white standard value for each type of the medium 8.

Moreover, the paper white standard value is a reflectance of the paper white patches 72A, 72B, 72C, 72D, and 72E acquired in the reference measurement position.

The standard white value is a reflectance of the standard white plate 30 acquired in the reference measurement position.

As illustrated in FIG. 3, the CPU 154 reads and executes various programs stored in the memory 153, and thereby functions as a scanning control unit 154A, a print control unit 154B, a measurement control unit 154C, a colorimetry unit 154D, a calibration unit 154E, and the like.

The scanning control unit 154A outputs a command signal for driving the supply unit 11, the transport unit 12, and the carriage moving unit 14 to the unit control circuit 152. Therefore, the unit control circuit 152 drives the roll drive motor of the supply unit 11 and supplies the medium 8 to the transport unit 12. In addition, the unit control circuit 152 drives the transport motor of the transport unit 12 to transport a predetermined region of the medium 8 to a position of the platen 122 facing the carriage 13 in the Y direction. In addition, the unit control circuit 152 drives the carriage motor 142 of the carriage moving unit 14 to move the carriage 13 in the X direction.

The print control unit 154B outputs a command signal for controlling the print portion 16 to the unit control circuit 152 based on the print data, for example, input from the external device 20. When the command signal is output from the print control unit 154B to the unit control circuit 152, the unit control circuit 152 outputs a print control signal to the print portion 16, drives the piezoelectric elements provided in the nozzles, and discharges ink to the medium 8. Moreover, when executing the print, the carriage 13 moves in the X direction, alternately repeats a dot forming operation for forming dots by discharging ink from the print portion 16 during the movement thereof and a transport operation for transporting the medium 8 in the Y direction, and prints an image constituted of a plurality of dots on the medium 8.

The measurement control unit 154C executes the spectroscopic measurement (colorimetry) in the measuring device 17.

Specifically, the measurement control unit 154C outputs a command signal for controlling light sources 171A1 and 171B1 to the unit control circuit 152, and emits light from the light sources 171A1 and 171B1. Furthermore, the measurement control unit 154C reads a drive voltage to an electrostatic actuator 56 (see FIG. 4) with respect to a wavelength of light transmitting the wavelength variable interference filter 5 which is described later from V-λ data of the memory 153, and outputs a command signal to the unit control circuit 152. Therefore, the unit control circuit 152 applies the drive voltage instructed to the wavelength variable interference filter 5 and causes light of a desired transmission wavelength to transmit from the wavelength variable interference filter 5.

Therefore, the measurement control unit 154C acquires the reflectance of evaluation patches 71C, 71Y, 71R, and 71G (see FIG. 5), or the paper white patches 72A, 72B, 72C, 72D, and 72E, and stores a colorimetric result in the memory 153 in association with a voltage (or wavelength of the light transmitting the wavelength variable interference filter 5 corresponding to the voltage) applied to the electrostatic actuator 56.

The colorimetry unit 154D is an example of the "correction portion" and corrects a reflectance with respect to each measurement wavelength based on a measurement value with respect to the measurement wavelength and the reference measurement value (paper white standard value and standard white value). Furthermore, the colorimetry unit 154D calculates a chromaticity (for example, an L* value, an a* value, and a b* value in L*a*b* color space) based on the corrected reflectance and stores the chromaticity in the memory 153.

The calibration unit 154E updates print profile data stored in the memory 153 based on the colorimetric result of the evaluation patches 71C, 71Y, 71R, and 71G.

Outline of Measuring Device

Figure 4:
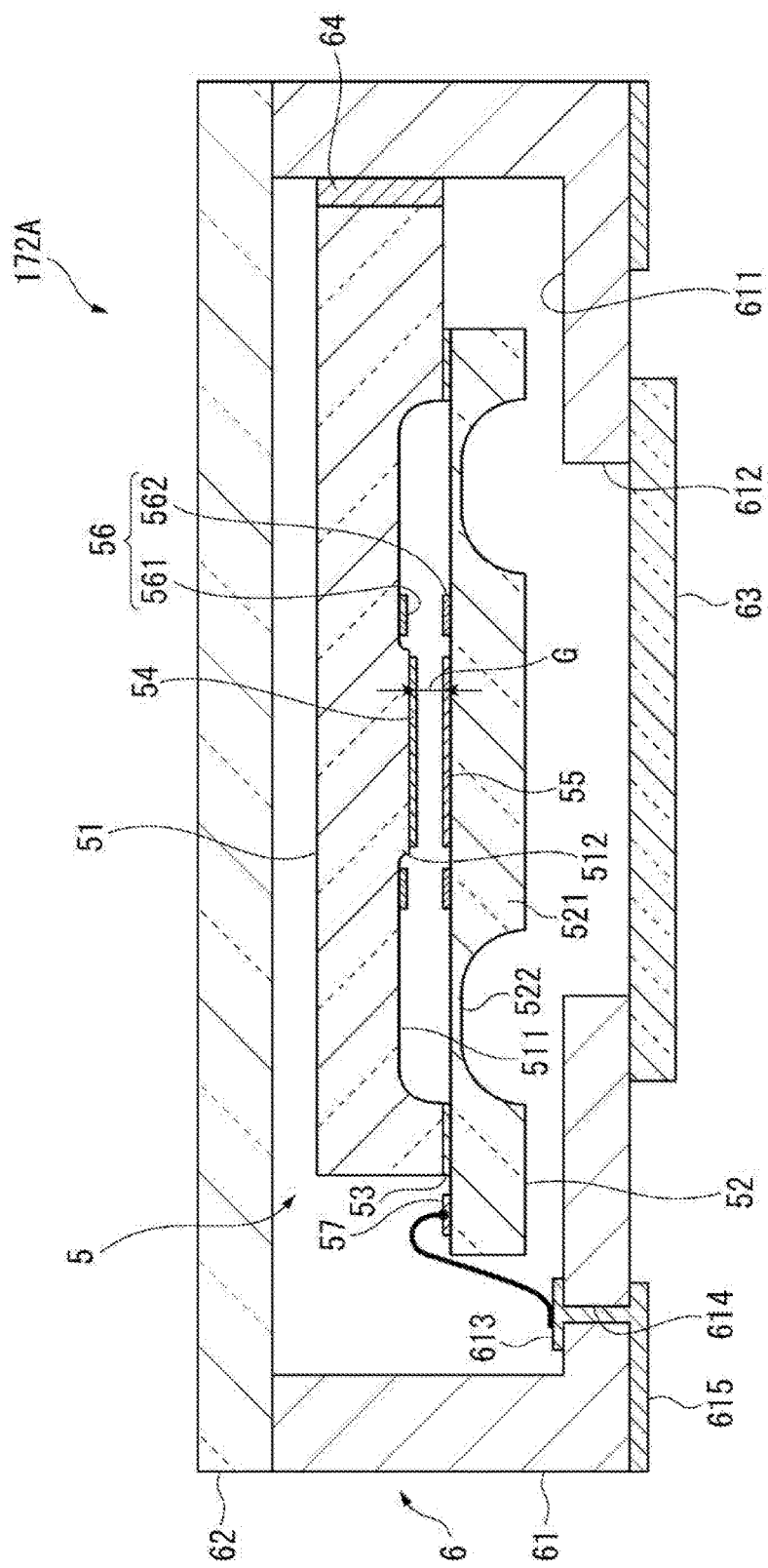
FIG. 4 is a sectional view illustrating a schematic configuration of a spectroscopic device included in a measurement portion of the measuring device according to the embodiment.

FIG. 4 is a sectional view illustrating a schematic configuration of a spectroscopic device included in a measurement portion of the measuring device according to the embodiment.

Next, an outline of the measuring device 17 will be described with reference to FIGS. 2 and 4.

As illustrated in FIG. 2, the measuring device 17 has the light source portion 171 that irradiates the medium 8 with the illumination light, the measurement portion 172 that acquires an amount of a reflected light (measurement light) which is acquired by reflecting the illumination light on the medium 8 as a measurement value, the carriage 13 (see FIG. 1) capable of moving the light source portion 171 and the measurement portion 172 relative to the medium 8, the control unit 15 (the memory 153 holding the paper white standard value that is the reference measurement value of the paper white patches 72A, 72B, 72C, 72D, and 72E), and the standard white plate 30 (see FIG. 1).

The measuring device 17 performs colorimetry of the paper white patch 72 and the evaluation patch 71. Specifically, the measuring device 17 acquires a measurement value of the paper white patches 72A, 72B, 72C, 72D, and 72E, and a measurement value of the evaluation patches 71C, 71Y, 71R, and 71G while the light source portion 171 and the measurement portion 172 mounted on the carriage 13 are moved relative to the medium 8.

In the measuring device 17, the light source portion 171 irradiates the medium 8 with the illumination light and the measurement portion 172 receives the reflected light (measurement light) reflected by the medium 8. A spectroscopic device 172A provided in the measurement portion 172 is able to select a transmission wavelength based on the control of the control unit 15. The measurement portion 172 performs the colorimetry of the medium 8 by measuring an amount of light of each wavelength in visible light.

Moreover, in the embodiment, the measuring device performs colorimetry according to a method (45/0° colorimetric system) of optical geometric conditions defined by a colorimetric standard (JIS Z 8722). That is, the illumination light from the light source portion 171 is incident on the measuring device 17 at an angle (angle of 45°±2°) of 45° with respect to a normal of the medium 8 and light reflected in a normal direction (angle within 10° with respect to the normal direction) of the medium 8 is received in the measurement portion 172. That is, an illumination direction in which the illumination light is directed toward the medium 8 and the measuring direction in which the measurement light is directed to the measurement portion 172 are different.

The light source portion 171 includes the first light source portion 171A and the second light source portion 171B. The first light source portion 171A, the second light source portion 171B, and the measurement portion 172 are disposed in the Y direction. Specifically, the first light source portion 171A is disposed on a side in the Y(+) direction with respect to the measurement portion 172 and the second light source portion 171B is disposed on a side in the Y(−) direction with respect to the measurement portion 172.

Furthermore, the first light source portion 171A, the second light source portion 171B, and the measurement portion 172 are the same in positions in the Z direction.

The first light source portion 171A includes the light source 171A1 and an illumination optical member 171A2, and irradiates the medium 8 with light at an angle of 45° with respect to the normal of the medium 8, for example, directed from the side in the Y(+) direction to the side in the Y(−) direction.

The second light source portion 171B includes the light source 171B1 and an illumination optical member 171B2, and irradiates the medium 8 with light at an angle of 45° with respect to the normal of the medium 8, for example, directed from the side in the Y(−) direction to the side in the Y(+) direction.

The light sources 171A1 and 171B1 are members emitting the illumination light with which the medium 8 is irradiated. In order to reduce size and weight of the light sources 171A1 and 171B1, it is preferable to use a LED or a LD (semiconductor laser) for the light sources 171A1 and 171B1.

The illumination optical members 171A2 and 171B2 are optical members that determine an irradiation direction or an irradiation range of the illumination light irradiated from the light sources 171A1 and 171B1, and, for example, are constituted of optical members such as single or a plurality of apertures, lenses, mirrors, or the like. For example, as the illumination optical members 171A2 and 171B2, a configuration, in which single or a plurality of apertures are provided and the medium 8 is irradiated with the illumination light having a predetermined optical path diameter transmitting the apertures, or the like is exemplified. In addition, as the illumination optical member 171B2, a collimator lens may be provided. In this case, the medium 8 is able to be irradiated with the parallel illumination light from the light source portion 171 and even in a case where a position of the medium 8 is displaced in the Z direction, it is possible to suppress a change in size (spot diameter) of an illumination region on the medium 8.

In the embodiment, the medium 8 is irradiated with two illumination lights by two light sources of the first light source portion 171A and the second light source portion 171B, but one light source may be provided. Furthermore, a plurality of illumination lights may be acquired from one light source by a beam splitter such as a half mirror.

The measurement portion 172 is constituted by the spectroscopic device 172A, a light receiving portion 172B, a light receiving optical member 172C, and the like. In the measurement portion 172, light (measurement light) reflected by the medium 8 is guided to the spectroscopic device 172A by the light receiving optical member 172C and light having a predetermined wavelength spectrally separated by the spectroscopic device 172A is received by the light receiving portion 172B.

The light receiving optical member 172C is constituted by single or a plurality of optical members. As the optical members, for example, single or a plurality of apertures can be exemplified. The measurement light reflected by a predetermined measuring region on the medium 8 can be guided to the spectroscopic device 172A and the light receiving portion 172B by providing the apertures. In addition, as the optical member constituting the light receiving optical member 172C, for example, a lens such as a condensing lens may be provided, or a band pass filter may be provided. In a case where the band pass filter is provided, it is possible to cut light (for example, light other than the visible light) other than a desired measurement wavelength range.

As illustrated in FIG. 4, the spectroscopic device 172A includes a casing 6 and the wavelength variable interference filter 5 (spectroscope) stored in an inside of the casing 6.

The wavelength variable interference filter 5 is an example of the "spectroscope" and is a wavelength variable Fabry-Perot etalon element (transmissive wavelength variable Fabry-Perot etalon). The wavelength variable interference filter 5 is disposed in the measurement portion 172 in a state of being stored in the casing 6. Moreover, for example, the wavelength variable interference filter 5 may be directly disposed in the measurement portion 172.

The wavelength variable interference filter 5 includes a fixed substrate 51 and a movable substrate 52 having light-transmitting property with respect to the visible light, and the fixed substrate 51 and the movable substrate 52 are bonded together by a bonding film 53 to be integrally configured. The fixed substrate 51 is provided with a first groove portion 511 and a second groove portion 512 having a shallower groove depth than that of the first groove portion 511 which are formed by etching. A fixed electrode 561 and a fixed reflection film 54 are respectively provided in the first groove portion 511 and the second groove portion 512. The fixed reflection film 54 is formed by, for example, a metal film such as Ag, an alloy film such as an Ag alloy, a dielectric multilayer film in which a high reflection layer and a low reflection layer are laminated, or a laminated body by laminating a metal film (alloy film) and a dielectric multilayer film.

The movable substrate 52 includes a movable portion 521 and a holding portion 522 which is provided outside the movable portion 521 and holds the movable portion 521. A surface of the movable portion 521 facing the fixed substrate 51 is provided with a movable electrode 562 facing the fixed electrode 561 and a movable reflection film 55 facing the fixed reflection film 54. As the movable reflection film 55, a reflection film having the same configuration as that of the fixed reflection film 54 which is described above can be used. The holding portion 522 is a diagram that surrounds a periphery of the movable portion 521 and is formed to have a smaller thickness than that of the movable portion 521.

Therefore, in the wavelength variable interference filter 5, the electrostatic actuator 56 is configured by the fixed electrode 561 and the movable electrode 562, and it is possible to change a gap dimension of a gap G between the fixed reflection film 54 and the movable reflection film 55 by applying a voltage to the electrostatic actuator 56. In addition, an outer peripheral portion (region which does not face the fixed substrate 51) of the movable substrate 52 is provided with a plurality of electrode pads 57 individually connected to the fixed electrode 561 and the movable electrode 562.

The casing 6 includes a base 61 and a glass substrate 62. The base 61 and the glass substrate 62 are bonded, for example, by a low-melting-point glass bonding or the like and thereby an accommodating space is formed therein and the wavelength variable interference filter 5 is stored in the accommodating space.

The base 61 is constituted by, for example, laminating thin ceramic plates and has a recessed portion 611 capable of storing the wavelength variable interference filter 5. The wavelength variable interference filter 5 is fixed to, for example, a side surface of the recessed portion 611 of the base 61 by a fixing member 64. A bottom surface of the recessed portion 611 of the base 61 is provided with a light transmission hole 612 and is bonded to a cover glass 63 that covers the light transmission hole 612.

In addition, the base 61 is provided with an inner terminal portion 613 that is connected to the electrode pad 57 of the wavelength variable interference filter 5, and the inner terminal portion 613 is connected to an outer terminal portion 615 provided on an outside of the base 61 via a conduction hole 614. The outer terminal portion 615 is electrically connected to the control unit 15.

Returning to FIG. 2, the light receiving portion 172B is disposed on an optical axis (on a straight line passing through center points of the reflection films 54 and 55) of the wavelength variable interference filter 5, receives light transmitting the wavelength variable interference filter 5 in a light receiving region, and outputs a detection signal (current value) corresponding to an amount of received light. Moreover, the detection signal output by the light receiving portion 172B is input into the control unit 15 via an I-V converter (not illustrated), an amplifier (not illustrated), and an AD converter (not illustrated).

Colorimetry by Measuring Device

In the printer 10, in a manufacturing factory, a test pattern is printed by the printer 10, the test pattern is read by a colorimeter or a scanner, reference color data (chromaticity (L* value, the a* value, and the b* value in L*a*b* color space) of a reference color) is acquired, and the reference color data is registered in the memory 153.

That is, in a state where the reference color data is registered in the memory 153, the printer 10 is shipped from the manufacturing factory.

Furthermore, in the printer 10, on a user side, a test pattern 70 (see FIG. 5) is printed on the medium 8 by the print portion 16, colorimetry of the test pattern 70 is performed by the measuring device 17, a colorimetric result (chromaticity of the test pattern 70) of the test pattern 70 by the measuring device 17 and the reference color data (chromaticity of the reference color) registered in the memory 153 in advance are compared, and in a case where both are different from each other, color correction (update of the print profile data) is performed.

Specifically, the measurement control unit 154C performs colorimetry of the test pattern 70, the colorimetric result of the test pattern 70 is corrected so that the colorimetry unit 154D has a correct colorimetric value, the calibration unit 154E compares the colorimetric result (chromaticity of the test pattern 70) of the test pattern 70 and the reference color data (chromaticity of the reference color) registered in the memory 153 in advance, and in a case where there is color unevenness (color deviation) in the test pattern 70 printed on the medium 8, color correction (update of the print profile data) is performed. That is, the printer 10 performs the color correction (update of the print profile data) based on the colorimetric result of the measuring device 17 and thereby it is possible to form an image reproducing a desired chromaticity of the user with high accuracy.

Therefore, in order for the printer 10 to reproduce a desired chromaticity of the user with high accuracy, it is important that the measuring device 17 accurately performs colorimetry of the test pattern 70 and correct chromaticity is acquired. In the embodiment, the measuring device 17 has an excellent configuration capable of accurately performing the colorimetry of the test pattern 70 and acquiring a correct chromaticity, and details thereof will be described below.

Figure 5:
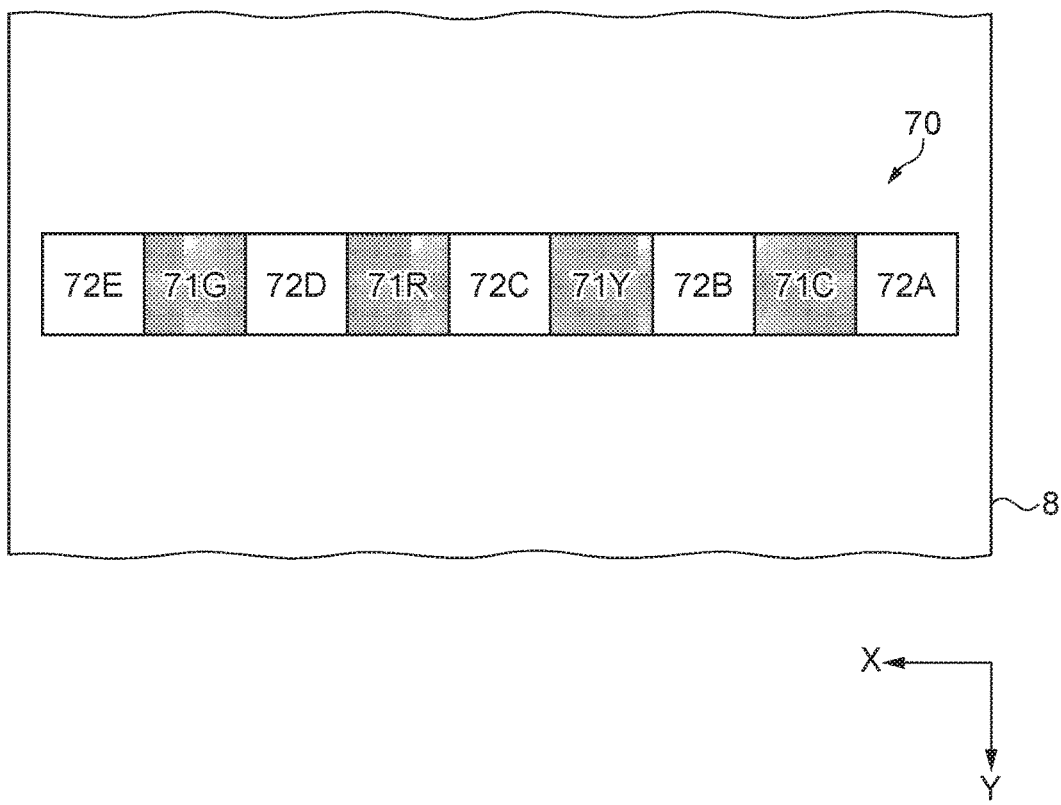
FIG. 5 is a schematic view of a test pattern printed on a medium.

FIG. 5 is a schematic view of the test pattern printed on the medium.

As illustrated in FIG. 5, in the test pattern 70, the evaluation patches 71C, 71Y, 71R, and 71G are formed. The evaluation patches 71C, 71Y, 71R, and 71G have respectively same shape and are formed in an island shape. The evaluation patches 71C, 71Y, 71R, and 71G are color patches (patches) of the reference color formed by discharging ink on the medium 8 by the print portion 16. In the following description, the evaluation patches 71C, 71Y, 71R, and 71G may be referred to as the evaluation patch 71.

A color of the evaluation patch 71C is cyan (C) and, hereinafter, the evaluation patch 71C may be referred to as the evaluation patch 71C of cyan. A color of the evaluation patch 71Y is yellow (Y) and, hereinafter, the evaluation patch 71Y may be referred to as the evaluation patch 71Y of yellow. A color of the evaluation patch 71R is orange (R) and, hereinafter, the evaluation patch 71R may be referred to as the evaluation patch 71R of orange. A color of the evaluation patch 71G is green (G) and, hereinafter, the evaluation patch 71G may be referred to as the evaluation patch 71G of green.

The paper white patches 72A, 72B, 72C, 72D, and 72E are not patches formed by discharging ink from the print portion 16 on the medium 8 but are portions exposed by the medium 8, are patches for the colorimetry of the medium 8, and may have any shape, form, and color as long as it is a portion which is exposed by the medium 8.

In FIG. 5, the paper white patches 72A, 72B, 72C, 72D, and 72E are drawn as a patch shape with frame lines surrounding a region for the sake of explanation, but the frame lines are not essential and may be a so-called margins.

In addition, although it is described as "paper white", the surface of the medium 8 does not need to be paper and the surface does not need to be white. It is only necessary that the reflectance of the surface of the medium 8 that is the measuring object may be a portion capable of being measured.

Hereinafter, the paper white patches 72A, 72B, 72C, 72D, and 72E may be referred to as the paper white patch 72.

In the test pattern 70, the paper white patch 72A, the evaluation patch 71C of cyan, the paper white patch 72B, the evaluation patch 71Y of yellow, the paper white patch 72C, the evaluation patch 71R of orange, the paper white patch 72D, the evaluation patch 71G of green, and the paper white patch 72E are sequentially disposed in the X direction. That is, the test pattern 70 has an arrangement of one row and one column in which the evaluation patch 71 and the paper white patch 72 are alternately disposed in the X direction.

The paper white patches 72A and 72B are the paper white patches 72 that are adjacent to the evaluation patch 71C of cyan and are positioned at positions close to the evaluation patch 71C of cyan. The paper white patches 72B and 72C are the paper white patches 72 that are adjacent to the evaluation patch 71Y of yellow and are positioned at positions close to the evaluation patch 71Y of yellow. The paper white patches 72C and 72D are the paper white patches 72 that are adjacent to the evaluation patch 71R of orange and are positioned at positions close to the evaluation patch 71R of orange. The paper white patches 72D and 72E are the paper white patches 72 that are adjacent to the evaluation patch 71G of green and are positioned at positions close to the evaluation patch 71G of green.

Figure 6:
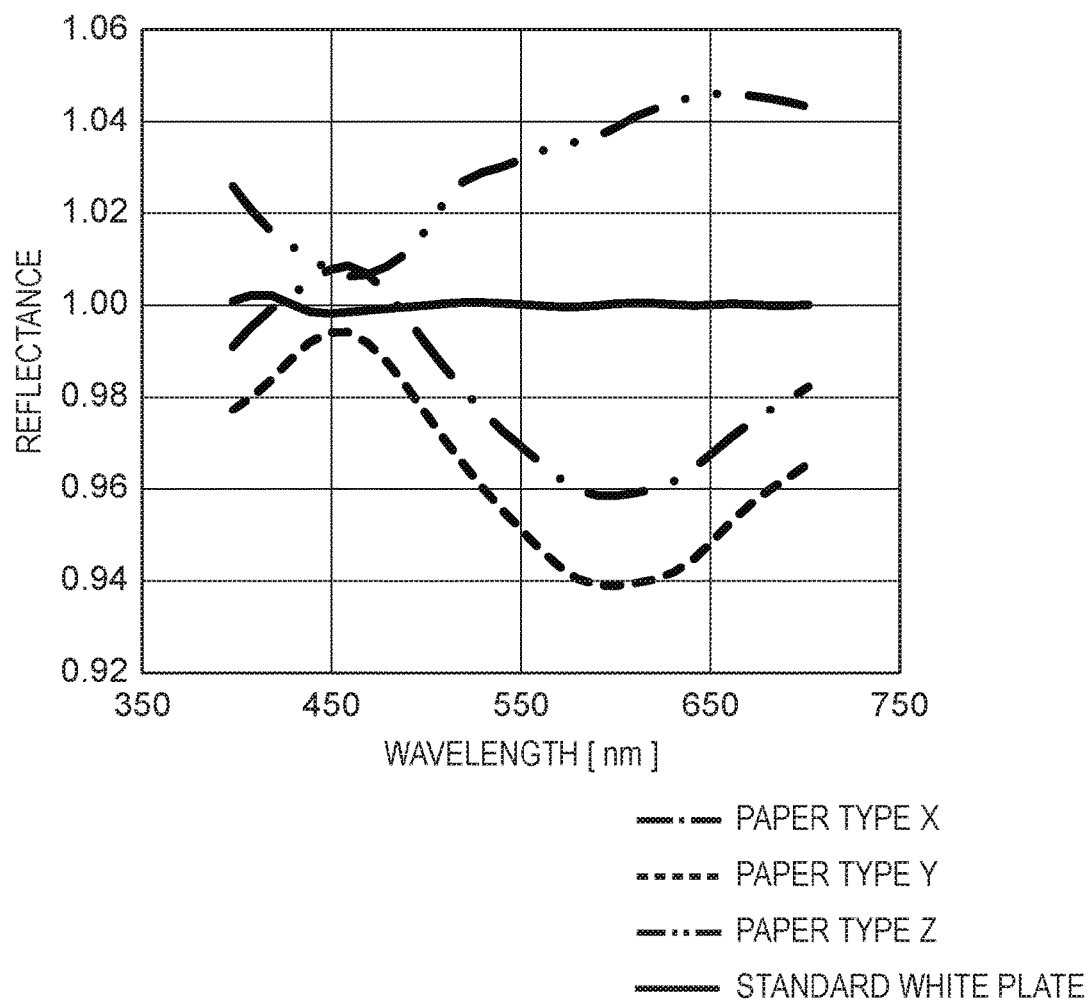
FIG. 6 is a graph illustrating a relationship between a wavelength and a reflectance of various media.

FIG. 6 is a graph illustrating a relationship between a wavelength and a reflectance of various media. Specifically, in FIG. 6, a relationship between the wavelength and the reflectance with respect to the medium 8 and the standard white plate 30 in a case of being constituted by a paper type X, a paper type Y, or a paper type Z is illustrated.

Figure 7:
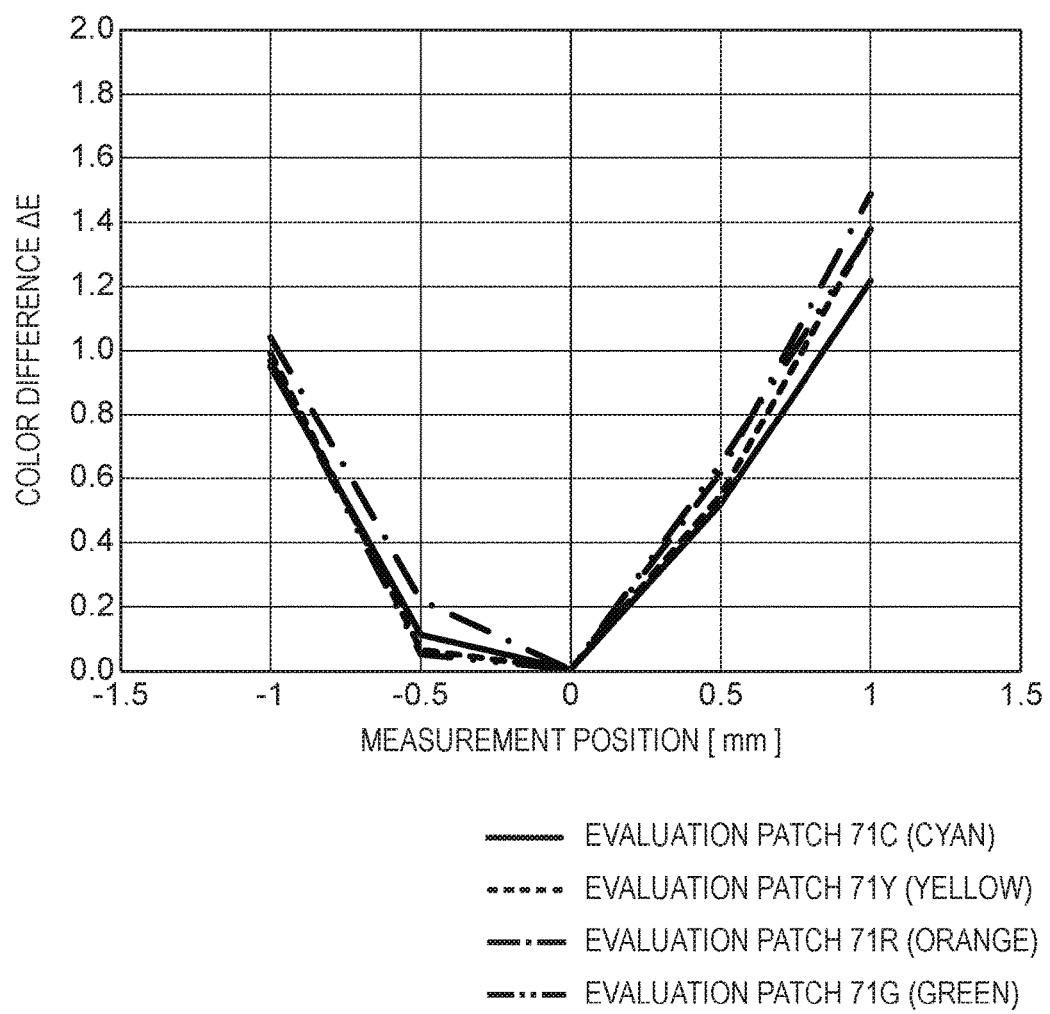
FIG. 7 is a graph illustrating a relationship between a color difference acquired from a reflectance of an evaluation patch calculated by Expression (1) and a measurement position of the evaluation patch.

FIG. 7 is a graph illustrating a relationship between a color difference acquired from a reflectance of an evaluation patch calculated by Expression (1) and a measurement position of the evaluation patch. A color difference ΔE in FIG. 7 is a difference between chromaticity of the evaluation patch 71 acquired by Expression (1) in the measurement position and chromaticity of the evaluation patch 71 acquired by Expression (1) in "zero (reference position)".

Moreover, the measurement position of the evaluation patch 71 is a position (distance between the measurement portion 172 and the evaluation patch 71) of the evaluation patch 71 with respect to the measurement portion 172 in the Z direction. In addition, in a case where the measurement position of the evaluation patch 71 is "zero", it is indicated that the evaluation patch 71 is positioned at the reference position that is a reference of the evaluation.

Furthermore, since the light source portion 171 (first light source portion 171A and the second light source portion 171B) and the measurement portion 172 are the same in position in the Z direction, the position (distance between the light source portion 171 and the evaluation patch 71) of the evaluation patch 71 with respect to the measurement portion 172 in the Z direction and the position of the evaluation patch 71 with respect to the light source portion 171 in the Z direction are the same. Therefore, the measurement position of the evaluation patch 71 is also the position of the evaluation patch 71 with respect to the measurement portion 172 in the Z direction.

Furthermore, the position (distance between the measurement portion 172 and the paper white patch 72) of the paper white patch 72 with respect to the measurement portion 172 in the Z direction and the position (distance between the light source portion 171 and the paper white patch 72) of the paper white patch 72 with respect to the light source portion 171 in the Z direction are referred to as the measurement positions of the paper white patch 72.

The medium 8 is constituted of an opaque member or a translucent member. As described above, as the medium 8, various paper types such as plain paper, a copy sheet, synthetic paper, coated paper, and various types of ink jet special paper, a transparent medium such as a PET film, and vinyl chloride film, can be used.

The standard white plate 30 is made of, for example, barium sulfate, magnesium oxide, alumina, a fluorine-based resin, or the like.

As illustrated in FIG. 6, the reflectance of the standard white plate 30 indicated by a solid line in the drawing is substantially 1 (100%) with respect to a wavelength region. The reflectance of the medium 8 is different depending on the paper type. The reflectance of the medium 8 constituted of the paper type Y indicated by a broken line in the drawing is lower than the reflectance of the standard white plate 30, the reflectance of the medium 8 constituted of the paper type Z indicated by a two-dotted chain line in the drawing is higher than the reflectance of the standard white plate 30, and the reflectance of the medium 8 constituted of the paper type X indicated by a one-dotted chain line in the drawing has a portion of which the reflectance is lower than the reflectance of the standard white plate 30 and the reflectance is higher than the reflectance thereof.

In addition, if a difference between the reflectance of the medium 8 and the reflectance of the standard white plate 30 is great, a difference of chromaticity (color tone) between the medium 8 and the standard white plate 30 is great.

In the embodiment, the medium 8 constituted of the paper type Y is used.

In addition, since the paper white patch 72 is a portion exposed by the medium 8, the reflectance of the paper white patch 72 is the reflectance of the medium 8.

For example, the reflectance of the evaluation patch 71 of which the colorimetry is performed by the colorimetry unit 154D can be represented by Expression (1).

$$\text{reflectance of evaluation patch} = \frac{\text{measurement value of evaluation patch}}{\text{standard white value}} \times \text{standard white correction data} \qquad (1)$$

The standard white value in Expression (1) is the reflectance of the standard white plate 30 acquired in the reference measurement position and, for example, is registered in the memory 153 in advance in a manufacturing factory of the printer 10.

Standard white correction data in Expression (1) is a correction value obtained by dividing the measurement value of the standard white plate 30 by the standard white value. For example, in a case where the amount of light of the light sources 171A1 and 171B1, sensitivity of the light receiving portion 172B, or the like is changed due to a change with time or contamination, there is a concern that the measurement value of the evaluation patch 71 is also changed. The standard white correction data is a correction value (calibration value) for correcting (calibrating) the measurement value of the evaluation patch 71 so as not to be changed even in a case where the amount of light of the light sources 171A1 and 171B1 or the sensitivity of the light receiving portion 172B is changed.

In general, the reflectance of the evaluation patch is not an absolute reflectance but is expressed as a relative value (relative value based on the standard white value) obtained by dividing the measurement value of the evaluation patch 71 by the standard white value.

In Expression (1), the reflectance of the evaluation patch 71 is calculated by correcting the measurement value of the evaluation patch represented as a relative value based on the standard white value by the standard white correction data. The reflectance of the evaluation patch 71 calculated by Expression (1) is corrected by the standard white correction data. Therefore, an influence of a case where the amount of light of the light sources 171A1 and 171B1 or the sensitivity of the light receiving portion 172B is changed is reduced, that is, an influence of a case where a colorimetry condition is changed is reduced. Therefore, it is possible to properly (accurately) acquire the reflectance of the evaluation patch 71 by Expression (1).

Meanwhile, as illustrated in FIG. 7, if the measurement position of the evaluation patch 71 is changed from "zero (reference position)", the color difference ΔE acquired from the reflectance of the evaluation patch 71 calculated by Expression (1) is increased (changed). That is, if the measurement position of the evaluation patch 71 is changed, the reflectance or the chromaticity of the evaluation patch 71 calculated by Expression (1) is changed. Therefore, it is difficult to accurately calculate the reflectance of the evaluation patch 71 and accurately acquire the chromaticity of the evaluation patch 71 by Expression (1).

The reason that it is difficult to accurately calculate the reflectance of the evaluation patch 71 and accurately acquire the chromaticity of the evaluation patch 71 by Expression (1) is conceivable as follows.

For example, if cockling or the like occurs in the medium 8, since the measurement position of the evaluation patch 71 is changed, the amount of the illumination light with which the evaluation patch 71 is irradiated from the light source portion 171 is reduced and the amount of the reflected light (measurement light) from the evaluation patch 71 received by the measurement portion 172 is reduced.

The carriage 13 on which the light source portion 171 and the measurement portion 172 are mounted is movable by the carriage guide shaft 141 in the X direction. For example, in a case where a part of the carriage guide shaft 141 is deflected and the carriage 13 is displaced to the platen 122 side, or in a case where the carriage 13 is displaced in the Z direction due to vibration during the moving of the carriage 13, similarly, the measurement position of the evaluation patch 71 is changed. Therefore, similar to a case where cockling occurs in the medium 8, the amount of the illumination light with which the evaluation patch 71 is irradiated or the amount of the reflected light from the evaluation patch 71 is reduced.

As described above, if the measurement position of the evaluation patch 71 is changed, since the amount of the illumination light with which the medium 8 is irradiated, or the amount of the reflected light from the medium 8 is changed, the reflectance of the evaluation patch 71 calculated by Expression (1) is changed, and it is difficult to accurately calculate the reflectance of the evaluation patch 71 by Expression (1) and accurately acquire the chromaticity of the evaluation patch 71.

The paper white patch is disposed close to the evaluation patch 71 and thereby the measurement position of the evaluation patch 71 and the measurement position of the paper white patch 72 are similarly changed. Therefore, the reflectance of the evaluation patch 71 in a case where the measurement position is changed and the reflectance of the paper white patch 72 in a case where the measurement position is changed are similarly changed. Therefore, it is conceivable that the reflectance of the evaluation patch 71 in a case where the measurement position is changed can be corrected by the change in the reflectance of the paper white patch 72 in a case where the measurement position is changed.

Therefore, it is conceivable that the reflectance of the evaluation patch 71 can be accurately calculated and the chromaticity of the evaluation patch 71 can be accurately acquired by Expression (2).

$$\text{reflectance of evaluation patch} = \left( \frac{\text{measurement value of evaluation patch}}{\text{standard white value}} \times \text{standard white correction data} \right) \times \frac{\text{standard white value}}{\text{measurement value of paper white patch}} \quad (2)$$

The change in the reflectance of the paper white patch 72 in a case where the measurement position is changed can be represented by a relative value obtained by dividing the relative value of the measurement value (reflectance of the paper white patch 72 in the measurement position) of the paper white patch 72 based on the standard white value (reflectance of the standard white plate 30 acquired in the reference measurement position), that is, the standard white value by the measurement value of the paper white patch 72.

Therefore, in Expression (2), the reflectance of the evaluation patch 71 is calculated by correcting the reflectance (reflectance calculated by a mathematical expression in parentheses) calculated by Expression (1) with the relative value which is obtained by dividing the standard white value by the measurement value of the paper white patch 72. In other words, in Expression (2), the relative value obtained by dividing the standard white value by the measurement value of the paper white patch 72 is a correction coefficient for correcting the change in the reflectance of the evaluation patch 71 in a case where the measurement position is changed, and the reflectance of the evaluation patch 71 calculated by Expression (1) is corrected by the correction coefficient.

Figure 8:
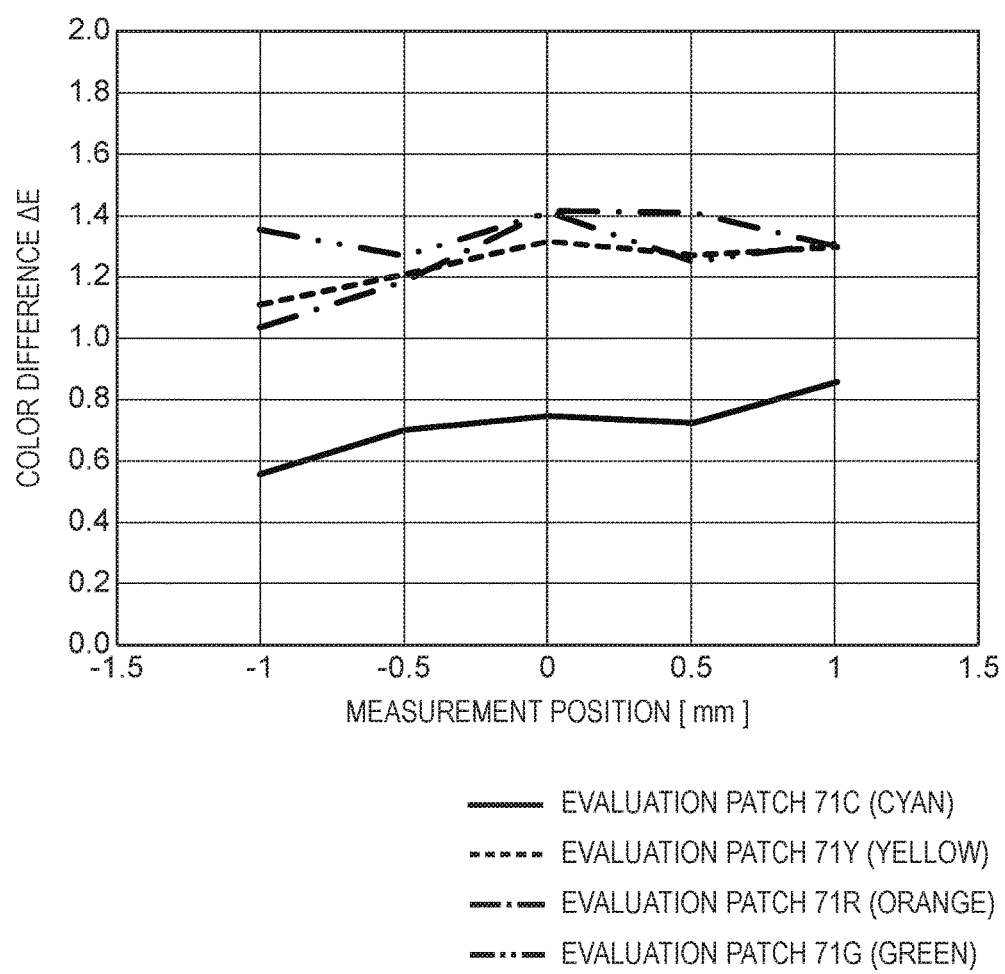
FIG. 8 is a graph illustrating a relationship between a color difference acquired from a reflectance of the evaluation patch calculated by Expression (2) and a measurement position of the evaluation patch.

FIG. 8 is a graph illustrating a relationship between a color difference acquired from a reflectance of the evaluation patch calculated by Expression (2) and a measurement position of the evaluation patch. Moreover, the color difference $\Delta E$ in FIG. 8 is a difference between the chromaticity of the evaluation patch 71 acquired by Expression (2) in the measurement position and the chromaticity of the evaluation patch 71 acquired by Expression (1) in "zero (reference position)".

As illustrated in FIG. 8, a change in the color difference $\Delta E$ in a case where the measurement position of the evaluation patch 71 is changed is smaller in the color difference $\Delta E$ acquired by Expression (2) than in the color difference $\Delta E$ acquired by Expression (1) as illustrated in FIG. 7. That is, if Expression (1) is corrected by the change in the reflectance of the paper white patch 72 in a case where the measurement position is changed, the change in the color difference $\Delta E$ of the evaluation patch 71 in a case where the measurement position is changed is small.

However, in FIG. 8, although the change in the color difference $\Delta E$ is small, the color difference $\Delta E$ in which the measurement position is zero (reference position) is not zero and is deviated from zero. That is, if the reflectance of the evaluation patch 71 calculated by Expression (1) is corrected by Expression (2), the chromaticity of the evaluation patch 71 is changed. As described above, in the correction by Expression (2), since the chromaticity of the evaluation patch 71 is changed, it is difficult to accurately calculate the reflectance of the evaluation patch 71 and accurately acquire the chromaticity of the evaluation patch 71 by Expression (2).

The reason that it is difficult to accurately calculate the reflectance of the evaluation patch 71 by Expression (2) and accurately acquire the chromaticity of the evaluation patch 71 is conceivable as follows.

In the printer 10, the ink droplets are discharged to pixels constituting the evaluation patch 71 and colored dots formed by the ink droplets are formed in the pixels. Therefore, the pixels constituting the evaluation patch 71 are configured of a portion in which the colored dots are disposed and a portion in which the colored dots are not disposed. The portion in which the colored dots are not disposed corresponds to a portion where the medium 8 is exposed so that the reflectance of the evaluation patch 71 receives the influence of reflectance of the medium 8.

As described above, in the embodiment, since the medium is constituted of the paper type Y, in the correction by Expression (2), it is conceivable that the difference in the reflectance between the medium 8 (paper white patch 72) constituted by the paper type Y and the standard white plate 30 (see FIG. 6), that is, the difference in the color tone between the medium 8 constituted by the paper type Y and the standard white plate 30 affects the chromaticity (or reflectance) of the evaluation patch 71, and the reflectance of the evaluation patch 71 is not accurately calculated (corrected).

Therefore, in a case where the difference in the color tone between the medium 8 and the standard white plate is great, in the correction by Expression (2), it is conceivable that it is difficult to perform the colorimetry of the evaluation patch 71 with high accuracy.

Therefore, in the embodiment, the reflectance of the evaluation patch 71 in a case where the measurement position is changed is corrected by Expression (3) indicated below and the chromaticity or the color difference ΔE of the evaluation patch 71 is acquired from the reflectance of the evaluation patch 71 calculated by Expression (3).

$$\text{reflectance of evaluation patch} = \left(\frac{\text{measurement value of evaluation patch}}{\text{standard white value}} \times \text{standard white correction data}\right) \times \frac{\text{paper white standard value}}{\text{measurement value of paper white patch}} \quad (3)$$

The paper white standard value in Expression (3) is the reflectance of the paper white patch 72 acquired in the reference measurement position, that is, the reflectance of the medium 8 acquired at the reference measurement position and, for example, is acquired in advance in a manufacturing factory of the printer 10, and is registered in the memory 153.

The change in the reflectance of the paper white patch 72 in a case where the measurement position is changed can be represented by the relative value of the measurement value (reflectance of the paper white patch 72 in the measurement position) of the paper white patch 72 based on the paper white standard value (reflectance of the paper white patch 72 acquired in the reference measurement position), that is, the relative value obtained by dividing the paper white standard value by the measurement value of the paper white patch 72.

Therefore, in Expression (3), the reflectance of the evaluation patch 71 is calculated by correcting the reflectance (reflectance calculated by a mathematical expression in parentheses) calculated by Expression (1) by the relative value obtained by dividing the paper white standard value by the measurement value of the paper white patch 72. In other words, in Expression (3), the relative value obtained by dividing the paper white standard value by the measurement value of the paper white patch 72 is a correction coefficient for correcting the change in the reflectance of the evaluation patch 71 in a case where the measurement position is changed, and the reflectance of the evaluation patch 71 calculated by Expression (1) is corrected by the correction coefficient.

In Expression (3), the correction coefficient for correcting the change in the reflectance of the evaluation patch 71 in a case where the measurement position is changed is represented only by the colorimetric value (paper white standard value and the measurement value of the paper white patch 72) of the paper white patch 72. Therefore, it is conceivable that the difference in the color tone between the medium 8 and the standard white plate 30 hardly affects.

Figure 9:
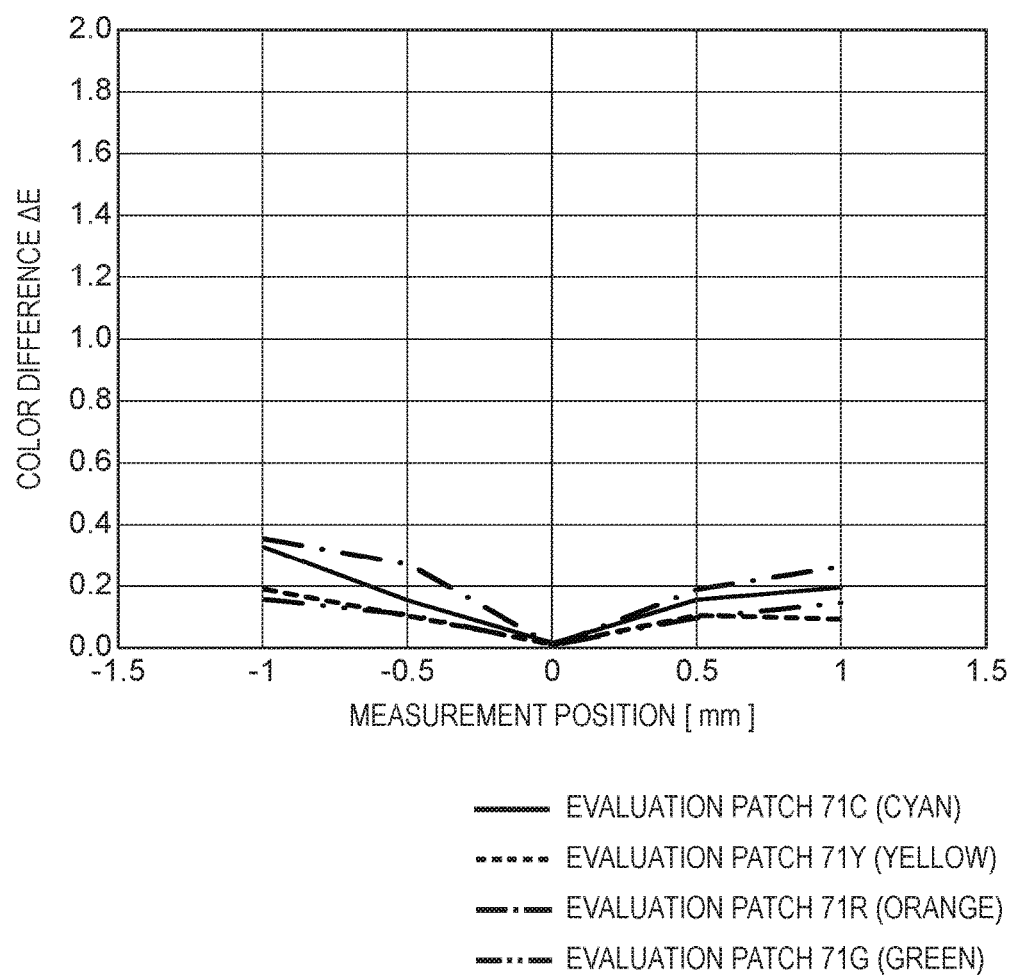
FIG. 9 is a graph illustrating a relationship between a color difference acquired from a reflectance of an evaluation patch calculated by Expression (3) and a measurement position of the evaluation patch.

FIG. 9 is a graph illustrating a relationship between a color difference acquired from the reflectance of the evaluation patch calculated by Expression (3) and the measurement position of the evaluation patch. Moreover, the color difference ΔE in FIG. 9 is a difference between the chromaticity of the evaluation patch 71 acquired by Expression (3) in the measurement position and the chromaticity of the evaluation patch 71 acquired by Expression (1) in "zero (reference position)".

As illustrated in FIG. 9, the change in the color difference ΔE in a case where the measurement position of the evaluation patch 71 is changed is smaller in the color difference ΔE acquired by Expression (3) than the color difference ΔE (see FIG. 7) acquired by Expression (1). That is, if Expression (1) is corrected by the change in the reflectance of the paper white patch 72 in a case where the measurement position is changed, the change in the color difference ΔE of the evaluation patch 71 in a case where the measurement position is changed is small.

Furthermore, since the color difference ΔE is zero in which the measurement position is zero (reference position), the chromaticity of the evaluation patch 71 acquired by Expression (3) in the reference position and the chromaticity of the evaluation patch 71 acquired by Expression (1) in the reference position are the same. That is, even in a case where the reflectance calculated by Expression (1) is corrected by Expression (3), the chromaticity of the evaluation patch 71 is not changed.

As described above, in the correction by Expression (3), since the color tone of the paper white patch 72 (medium 8) does not affect, the change in the chromaticity of the evaluation patch 71 does not occur and the change of the color difference ΔE of the evaluation patch 71 in a case where the measurement position is changed can be reduced.

Therefore, in a case where the measurement position of the evaluation patch 71 is changed, or in a case where the color tone in the paper white patch 72 and the standard white plate 30 is different, it is possible to accurately correct the reflectance of the evaluation patch 71 and to accurately acquire the chromaticity of the evaluation patch 71 by correcting the reflectance of the evaluation patch 71 by Expression (3).

Therefore, in the measuring device 17 according to the embodiment, it is possible to execute the colorimetry with high accuracy by correcting the measurement value of the evaluation patch 71 by Expression (3) based on the measurement value of the paper white patch 72 and the paper white standard value.

In addition, in the printer 10, since the change in the measurement position of the evaluation patch 71 is less than substantially ±0.2 mm, if the reflectance of the evaluation patch 71 is corrected by Expression (3), it is possible to control the color difference ΔE of a case where the measurement position of the evaluation patch 71 is changed in a range of substantially ±0.2 mm to less than 0.2 (see FIG. 9). Furthermore, if the color difference ΔE is controlled to less than 0.2, the chromaticity of the evaluation patch 71 acquired by the measuring device 17 and the reference color data registered in the memory 153 are compared, and the color correction (update of the print profile data) is performed in a case where both are different. Therefore, the printer 10 is able to form an image reproducing a desired chromaticity of the user with high accuracy.

That is, the printer 10 is able to form an image reproducing a desired chromaticity of the user with high accuracy by correcting the reflectance of the evaluation patch 71 by Expression (3).

Furthermore, in the embodiment, as illustrated in Expression (3), in addition to performing the correction of the measurement value of the evaluation patch 71 based on the measurement value of the paper white patch 72 and the paper white standard value, the correction of the measurement value of the evaluation patch 71 is performed based on the measurement value of the standard white plate 30 and the standard white value. That is, in the embodiment, the measurement value (reflectance of the evaluation patch 71) of the evaluation patch 71 is corrected by the standard white correction data for performing the correction of a case where the amount of light of the light sources 171A1 and 171B1, the sensitivity of the light receiving portion 172B, or the like is changed.

According to such a configuration, even in a case where the amount of light of the light sources 171A1 and 171B1, the sensitivity of the light receiving portion 172B, or the like is changed, it is possible to accurately calculate the reflectance of the evaluation patch 71 and to accurately acquire the chromaticity of the evaluation patch 71.

Moreover, in a case where a use time of the light sources 171A1 and 171B1, or the light receiving portion 172B is short and the change in the amount of light of the light sources 171A1 and 171B1, the sensitivity of the light receiving portion 172B, or the like is small, the correction by the standard white correction data can be omitted from. Expression (3). That is, it is possible to accurately calculate the reflectance of the evaluation patch 71 and accurately acquire the chromaticity of the evaluation patch 71 by Expression (4) described as follows.

$$\text{reflectance of evaluation patch} = \frac{\text{measurement value of evaluation patch}}{\text{standard white value}} \times \frac{\text{paper white standard value}}{\text{measurement value of paper white patch}} \quad (4)$$

Measuring Method

Figure 10:
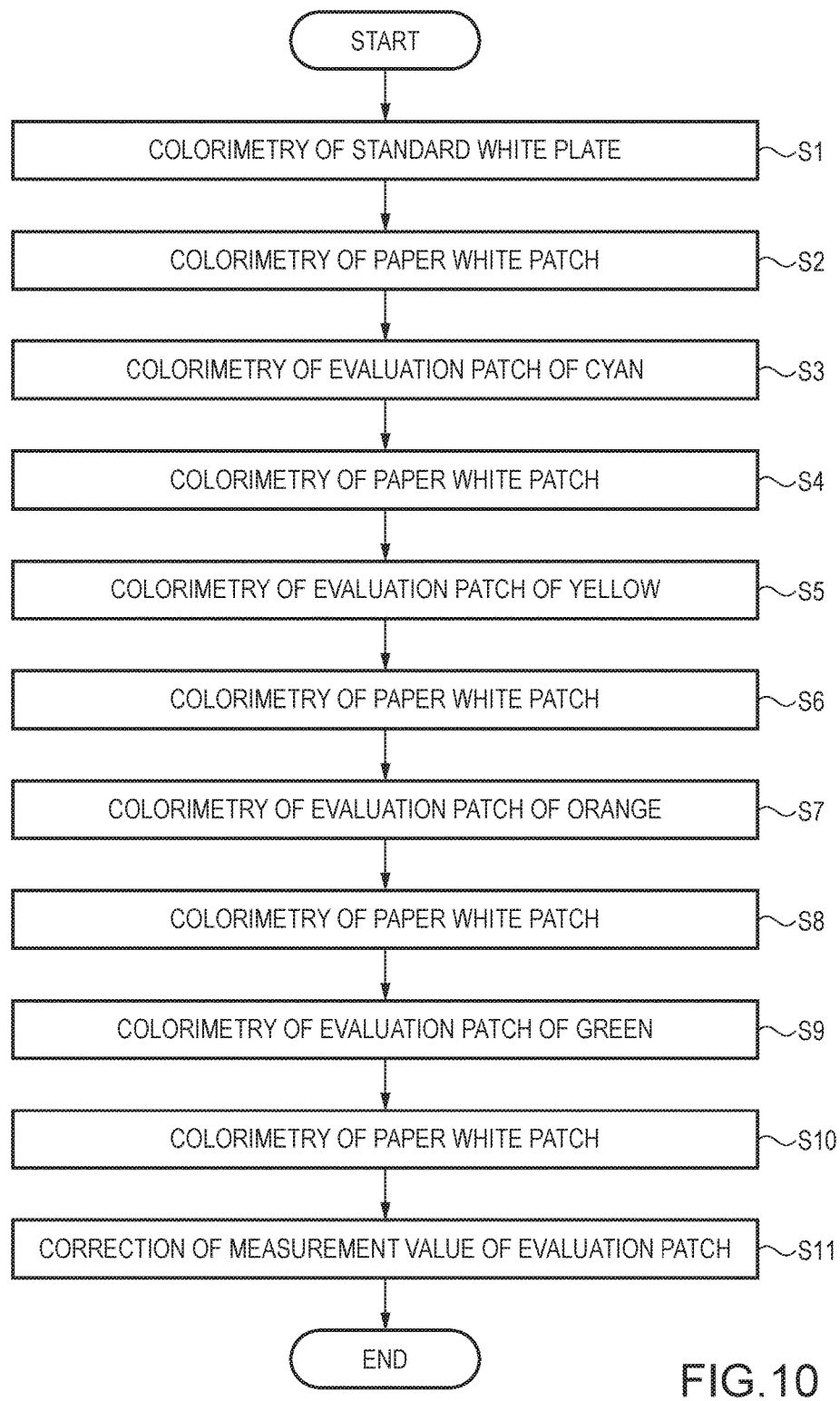
FIG. 10 is a process flow illustrating a measuring method according to the embodiment.

FIG. 10 is a process flow illustrating a measuring method according to the embodiment.

Next, the measuring method of the measuring device 17 according to the embodiment will be described with reference to FIG. 10.

As illustrated in FIG. 10, the measuring method of the measuring device 17 according to the embodiment includes a step of performing the colorimetry of the standard white plate 30 (step S1), a step of performing the colorimetry of the paper white patch 72A (step S2), a step of performing the colorimetry of the evaluation patch 71C of cyan (step S3), a step of performing the colorimetry of the paper white patch 72B (step S4), a step of performing the colorimetry of the evaluation patch 71Y of yellow (step S5), a step of performing the colorimetry of the paper white patch 72C (step S6), a step of performing the colorimetry of the evaluation patch 71R of orange (step S7), a step of performing the colorimetry of the paper white patch 72D (step S8), a step of performing the colorimetry of the evaluation patch 71G of green (step S9), a step of performing the colorimetry of the paper white patch 72E (step S10), and a step of correcting the measurement value of the evaluation patch 71 (step S11).

Moreover, step S1 is an example of the "step of acquiring the measurement value of the standard white plate". Steps S3, S5, S7, and S9 are an example of the "step of acquiring the measurement value of the evaluation patch". Steps S2, S4, S6, S8 and S10 are an example of the "step of acquiring the measurement value of the paper white patch". Step S11 is an example of the "step of correcting the measurement value of the evaluation patch based on the measurement value of the paper white patch and the paper white standard value", and is an example of the "step of correcting the measurement value of the evaluation patch based on the measurement value of the standard white plate and the standard white value".

In step S1, a worker sets the standard white plate 30 at a predetermined position (for example, on the platen 122), the light source portion 171 irradiates the standard white plate 30 with the illumination light, the scanning control unit 154A moves the carriage 13 so that the measurement portion 172 can receive the reflected light from the standard white plate 30. Subsequently, the measurement control unit 154C performs the colorimetry of the standard white plate 30 and stores the measurement value (reflectance of the standard white plate 30) of the standard white plate 30 in the memory 153.

In other words, step S1 is a calibration step of calibrating the colorimetry condition so that the measurement value (reflectance of the standard white plate 30 at the measurement position) of the standard white plate 30, the measurement value (reflectance of the evaluation patch 71 at the measurement position) of the evaluation patch 71, or the measurement value (reflectance of the paper white patch 72 at the measurement position) of the paper white patch 72 is not changed in a case where the amount of light of the light sources 171A1 and 171B1, the sensitivity of the light receiving portion 172B, or the like is changed. The colorimetry unit 154D can properly correct the measurement value of the evaluation patch 71 by step S1 in step S11 which is described below.

For example, if the use time of the light sources 171A1 and 171B1, or the light receiving portion 172B is short and the amount of light of the light sources 171A1 and 171B1, or the sensitivity of the light receiving portion 172B is not changed, it is possible to omit step S1.

For example, a configuration, in which the standard white plate 30 is disposed (fixed) in a predetermined region (for example, a maintenance region in which maintenance of the print portion 16 is performed) of the printer 10, and the colorimetry of the standard white plate 30 is automatically performed without manually setting the standard white plate 30 and performing the colorimetry of the standard white plate 30 by a worker, may be provided.

Moreover, in the embodiment, the step of performing the colorimetry of the standard white plate 30 (step S1) is performed before the step of performing the colorimetry of the evaluation patch 71 (steps S3, S5, S7, and S9), or the step of performing the colorimetry of the paper white patch 72 (S2, S4, S6, S8, and S10), but the invention is not limited thereto. For example, the step of performing the colorimetry of the standard white plate 30 (step S1) may be performed after the step of performing the colorimetry of the evaluation patch 71 (steps S3, S5, S7, and S9), or the step of performing the colorimetry of the paper white patch 72 (S2, S4, S6, S8, and S10). In addition, the step of performing the colorimetry of the standard white plate 30 (step S1) may be performed between the step of performing the colorimetry of the evaluation patch 71 (steps S3, S5, S7, and S9), and the step of performing the colorimetry of the paper white patch 72 (S2, S4, S6, S8, and S10).

Subsequently, a worker removes the standard white plate 30 from a predetermined position and performs the colorimetry (step S2 to step S10) of the evaluation patch 71 or the paper white patch 72. In the colorimetry (step S2 to step S10) of the evaluation patch 71 or the paper white patch 72, the scanning control unit 154A moves the carriage 13 on the test pattern 70 (see FIG. 5) in the X direction, and the measurement control unit 154C performs the colorimetry of the evaluation patch 71 or the paper white patch 72.

Specifically, the carriage 13 is moved from the paper white patch 72A to the paper white patch 72E, and sequentially performs the colorimetry of the paper white patch 72A, the evaluation patch 71C of cyan, the paper white patch 72B, the evaluation patch 71Y of yellow, the paper white patch 72C, the evaluation patch 71R of orange, the paper white patch 72D, the evaluation patch 71G of green, and the paper white patch 72E in order. That is, in the embodiment, the process (steps S3, S5, S7, and S9) of performing the colorimetry of the evaluation patch 71 and the process (steps S2, S4, S6, S8, and S10) of performing the colorimetry of the paper white patch 72 are alternately and continuously performed.

Moreover, the order of performing the colorimetry of the evaluation patches 71C, 71Y, 71R, and 71G, or the order of performing the colorimetry of the paper white patches 72A, 72B, 72C, 72D, and 72E is determined by a layout of the test pattern 70 or a moving method of the carriage 13. Therefore, the order of performing the colorimetry of the evaluation patches 71C, 71Y, 71R, and 71G, or the order of performing the colorimetry of the paper white patches 72A, 72B, 72C, 72D, and 72E is arbitrary.

In step S2, the measurement control unit 154C performs the colorimetry of the paper white patch 72A and stores the measurement value (reflectance of the paper white patch 72A at the measurement position) of the paper white patch 72A in the memory 153.

In step S3, the measurement control unit 154C performs the colorimetry of the evaluation patch 71C of cyan and stores the measurement value (reflectance of the evaluation patch 71C of cyan at the measurement position) of the evaluation patch 71C of cyan in the memory 153.

In step S4, the measurement control unit 154C performs the colorimetry of the paper white patch 72B and stores the measurement value (reflectance of the paper white patch 72B at the measurement position) of the paper white patch 72B in the memory 153.

In step S5, the measurement control unit 154C performs the colorimetry of the evaluation patch 71Y of yellow and stores the measurement value (reflectance of the evaluation patch 71Y of yellow at the measurement position) of the evaluation patch 71Y of yellow in the memory 153.

In step S6, the measurement control unit 154C performs the colorimetry of the paper white patch 72C and stores the measurement value (reflectance of the paper white patch 72C at the measurement position) of the paper white patch 72C in the memory 153.

In step S7, the measurement control unit 154C performs the colorimetry of the evaluation patch 71R of orange and stores the measurement value (reflectance of the evaluation patch 71R of orange at the measurement position) of the evaluation patch 71R of orange in the memory 153.

In step S8, the measurement control unit 154C performs the colorimetry of the paper white patch 72D and stores the measurement value (reflectance of the paper white patch 72D at the measurement position) of the paper white patch 72D in the memory 153.

In step S9, the measurement control unit 154C performs the colorimetry of the evaluation patch 71G of green and stores the measurement value (reflectance of the evaluation patch 71G of green at the measurement position) of the evaluation patch 71G of green in the memory 153.

In step S10, the measurement control unit 154C performs the colorimetry of the paper white patch 72E and stores the measurement value (reflectance of the paper white patch 72E at the measurement position) of the paper white patch 72E in the memory 153.

In step S11, the colorimetry unit 154D corrects the measurement value of the evaluation patch 71 acquired insteps S3, S5, S7, and S9, and acquires accurate reflectance or accurate chromaticity of the evaluation patch 71 based on the measurement value of the standard white plate 30 that is acquired in step S1, the standard white value registered in the memory 153, the measurement value of the paper white patch 72 acquired in steps S2, S4, S6, S8, and S10, and the paper white standard value registered in the memory 153.

In step S11, the colorimetry unit 154D corrects the measurement value of the evaluation patch 71C of cyan based on Expression (3) using the measurement value of the paper white patches 72A and 72B adjacent to the evaluation patch 71C of cyan. In other words, the colorimetry unit 154D corrects the reflectance of the evaluation patch 71C of cyan and acquires the chromaticity of the evaluation patch 71C of cyan based on Expression (3) using the measurement value of the paper white patches 72A and 72B positioned close to the evaluation patch 71C of cyan in a case where a plurality of paper white patches 72 are present.

For example, since the paper white patch 72E positioned away from the evaluation patch 71C of cyan is different in the measurement position from the evaluation patch 71C of cyan, there is a concern that the reflectance of the paper white patch 72E positioned away from the evaluation patch 71C of cyan and the reflectance of the evaluation patch 71C of cyan are different. On the other hand, since the paper white patches 72A and 72B positioned close to the evaluation patch 71C of cyan are substantially the same in the measurement position as the evaluation patch 71C of cyan, the reflectance of the paper white patches 72A and 72B positioned close to the evaluation patch 71C of cyan, and the reflectance of the evaluation patch 71C of cyan are substantially the same.

Therefore, it is preferable that the colorimetry unit 154D corrects the reflectance of the evaluation patch 71C of cyan and acquires the chromaticity of the evaluation patch 71C of cyan based on Expression (3) using not the measurement value of the paper white patch 72E positioned away from the evaluation patch 71C of cyan, but the measurement value of the paper white patches 72A and 72B positioned close to the evaluation patch 71C of cyan in a case where the plurality of paper white patches 72 are present.

For example, in a case where the measurement position of the paper white patch 72 is locally changed, a measurement value which is not preferable for the correction of the reflectance of the evaluation patch 71C of cyan may be included in one of the measurement values of a plurality of paper white patches 72A and 72B positioned close to the evaluation patch 71C of cyan.

In this case, the colorimetry unit 154D can properly correct the reflectance of the evaluation patch 71C of cyan based on Expression (3) if the average value of the measurement values of the plurality of paper white patches 72A and 72B which are present is used compared to a case where one of the average values of the measurement values of the plurality of paper white patches 72A and 72B which are present is used.

In other words, a bad influence of a case where the measurement value which is not preferable for correction of the reflectance of the evaluation patch 71C of cyan is included can be reduced by using the average value of the measurement values of the plurality of paper white patches 72A and 72B which are present compared to a case where one of the measurement values of the plurality of paper white patches 72A and 72B is used.

Moreover, in a case where the change in the measurement position of the paper white patch 72 is locally small and the measurement value which is not preferable for correction of the reflectance of the evaluation patch 71C of cyan is unlikely to be included in the measurement values of the plurality of paper white patches 72A and 72B, the reflectance of the evaluation patch 71C of cyan may be corrected based on Expression (3) using one of the measurement values of the plurality of paper white patches 72A and 72B which are present close to the evaluation patch 71C of cyan.

That is, the colorimetry unit 154D may be configured to correct the measurement value of the evaluation patch 71C of cyan based on Expression (3) using one of the measurement value of the paper white patch 72A and the measurement value of the paper white patch 72B.

Subsequently, in step S11, similar to a case where the measurement value of the evaluation patch 71C of cyan is corrected, the colorimetry unit 154D corrects the measurement value of the evaluation patch 71Y of yellow based on Expression (3) using the measurement values of the paper white patches 72B and 72C positioned close to the evaluation patch 71Y of yellow among the plurality of paper white patches 72.

Subsequently, in step S11, similar to a case where the measurement value of the evaluation patch 71C of cyan is corrected, the colorimetry unit 154D corrects the measurement value of the evaluation patch 71R of orange based on Expression (3) using the measurement values of the paper white patches 72C and 72D positioned close to the evaluation patch 71R of orange among the plurality of paper white patches 72.

Subsequently, in step S11, similar to a case where the measurement value of the evaluation patch 71C of cyan is corrected, the colorimetry unit 154D corrects the measurement value of the evaluation patch 71G of green based on Expression (3) using the measurement values of the paper white patches 72D and 72E positioned close to the evaluation patch 71G of green among the plurality of paper white patches 72.

Furthermore, in step S11, the colorimetry unit 154D calculates the L* value, the a* value, and the b* value of the evaluation patch 71C of cyan and acquires the chromaticity of the evaluation patch 71C of cyan from the reflectance of the corrected evaluation patch 71C of cyan. Subsequently, the colorimetry unit 154D calculates the L* value, the a* value, and the b* value of the evaluation patch 71Y of yellow and acquires the chromaticity of the evaluation patch 71Y of yellow from the reflectance of the corrected evaluation patch 71Y of yellow. Subsequently, the colorimetry unit 154D calculates the L* value, the a* value, and the b* value of the evaluation patch 71R of orange and acquires the chromaticity of the evaluation patch 71R of orange from the reflectance of the corrected evaluation patch 71R of orange. Subsequently, the colorimetry unit 154D calculates the L* value, the a* value, and the b* value of the evaluation patch 71G of green and acquires the chromaticity of the evaluation patch 71G of green from the reflectance of the corrected evaluation patch 71G of green.

Therefore, the calibration unit 154E compares the chromaticity of the evaluation patches 71C, 71Y, 71R, and 71G and the reference color data registered in the memory 153 in advance, determines whether or not color unevenness (color deviation) is present in the reference color corresponding to the evaluation patches 71C, 71Y, 71R, and 71G, and updates the print profile data in a case where unevenness (color deviation) is present in the evaluation patches 71C, 71Y, 71R, and 71G.

According to the configuration, the printer 10 can form an image reproducing a desired chromaticity of the user with high accuracy.

Other Test Patterns

Figure 11:
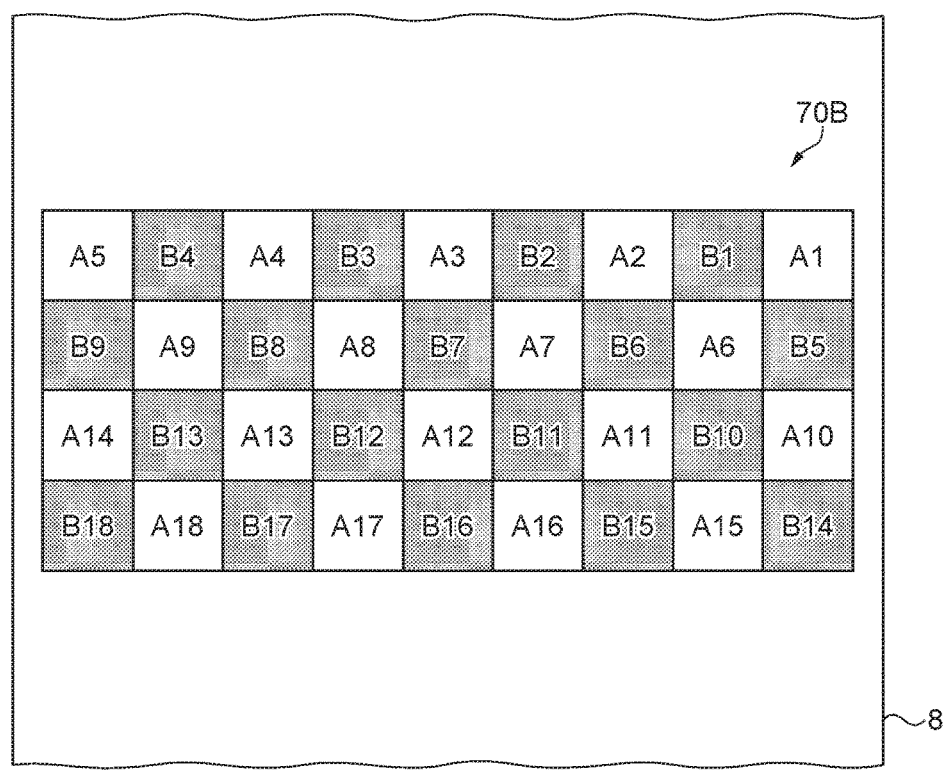
FIG. 11 is a schematic view of another test pattern.
Figure 11:
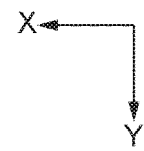
Figure 12:
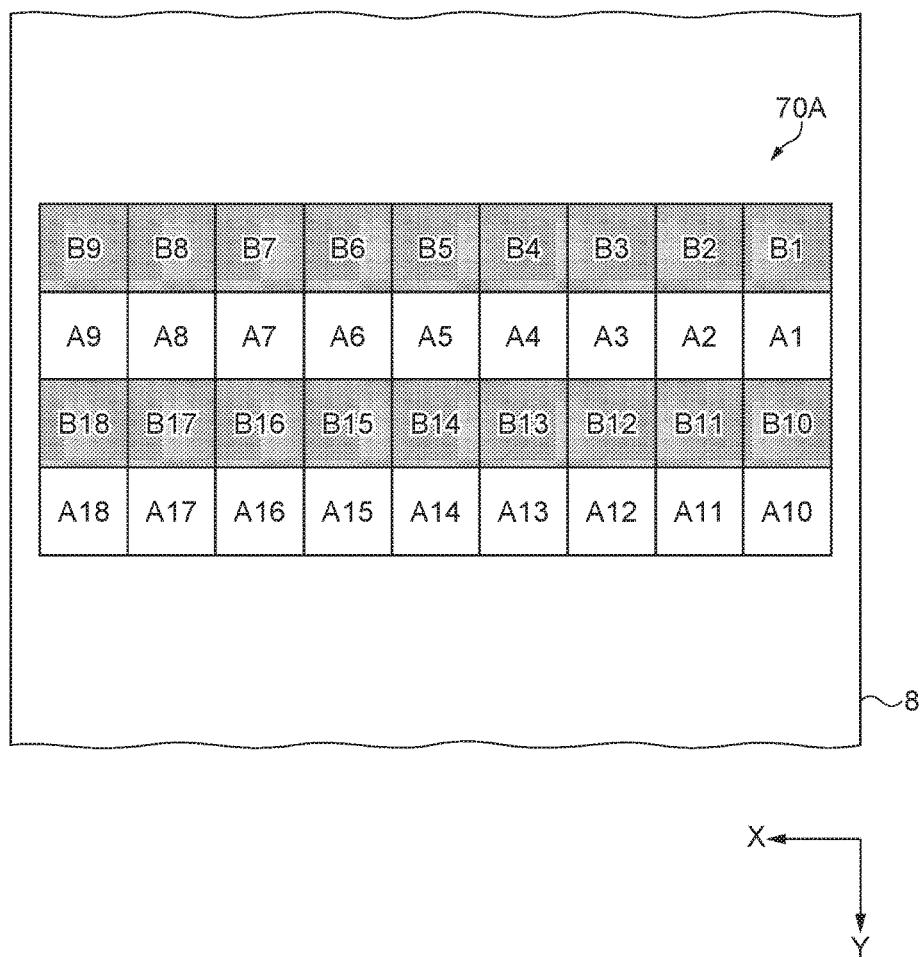
FIG. 12 is a schematic view of another test pattern.

FIGS. 11 and 12 are schematic views of other test patterns.

In FIGS. 11 and 12, reference numerals A1 to A18 are assigned to regions (paper white regions) in which paper white patches 72 are disposed, and reference numerals B1 to B18 are assigned to regions (evaluation regions) in which evaluation patches 71 are disposed. Furthermore, the paper white regions A1 to A18 are referred to as a paper white region A and the evaluation regions B1 to B18 are referred to as an evaluation region B. In addition, one paper white patch 72 is disposed in one paper white region A and one evaluation patch 71 is disposed in one evaluation region B.

Next, outlines of other test patterns 70B and 70A will be described with reference to FIGS. 11 and 12.

As illustrated in FIG. 11, the other test pattern 70B has an arrangement of four rows and four columns in which, the paper white region A (paper white patch 72) and the evaluation region B (evaluation patch 71) are alternately disposed in the X direction and the Y direction. On the other hand, the test pattern 70 described above has the arrangement of one row and one column in which the paper white patch 72 and the evaluation patch 71 are alternately disposed in the X direction.

In the test pattern 70B, the paper white regions A1 to A5 and the evaluation regions B1 to B4 are alternately disposed in a first row in the X direction, the paper white regions A6 to A9 and the evaluation regions B5 to B9 are alternately disposed in a second row in the X direction, the paper white regions A10 to A14 and the evaluation regions B10 to B13 are alternately disposed in a third row in the X direction, and the paper white regions A10 to A18 and the evaluation regions B14 to B18 are alternately disposed in a fourth row in the X direction.

Therefore, a paper white patch 72An (not illustrated) is disposed in a paper white region An and an evaluation patch 71Bn (not illustrated) is disposed in an evaluation region Bn.

Four paper white patches 72A2, 72A6, 72A7, and 72A11 are disposed at positions close to the evaluation patch 71B6 disposed in the evaluation region B6, and four paper white patches 72A4, 72A8, 72A9, and 72A13 are disposed at positions close to the evaluation patch 71B8 disposed in the evaluation region B8.

On the other hand, in the test pattern 70, for example, two paper white patches 72A and 72B are disposed at positions close to the evaluation patch 71C of cyan.

As described above, in the test pattern 70B, the number of the paper white patches 72 disposed at the positions close to the evaluation patch 71 is greater than that of the test pattern 70.

If the paper white patch 72 is present at a measurement position different from the measurement position of the evaluation patch 71 among the plurality of paper white patches 72 disposed at the positions close to the evaluation patch 71, the measurement value of the paper white patch 72 at the different measurement position is not preferable for correcting the measurement value of the evaluation patch 71. In addition, it is difficult to specify the position or the number of the paper white patches 72 which are not preferable to correct the measurement value of the evaluation patch 71.

Therefore, if the number of the paper white patches 72 disposed at positions close to the evaluation patch 71 is increased and the measurement value of the evaluation patch 71 is corrected by an average value of the measurement values of the paper white patches 72 disposed at positions close to the evaluation patch 71, an influence of the measurement value of the paper white patches 72 which are not preferable to correct the measurement value of the evaluation patch 71 is reduced and it is possible to more properly correct the measurement value of the evaluation patch 71 than a case where the number of the paper white patches 72 disposed at positions close to the evaluation patch 71 is small.

As illustrated in FIG. 12, in the test pattern 70A, the evaluation regions B1 to B9 are disposed in a first row in the X direction in order, the paper white regions A1 to A9 are disposed in a second row in the X direction in order, the evaluation regions B10 to B18 are disposed in a third row in the X direction in order, and the paper white regions A10 to A18 are disposed in a fourth row in the X direction in order.

The paper white patches 72 having the same configuration are disposed in the paper white regions A1 to A9 of the second row and the paper white regions A10 to A18 of the fourth row. Therefore, the band-shaped paper white patches 72 elongated in the X direction are disposed in the second row and the fourth row in the test pattern 70A.

Therefore, a scanning control unit 154A moves a carriage 13 in the X direction and a measurement control unit 154C performs colorimetry of the band-shaped paper white patches 72 disposed in the paper white regions A1 to A9 of the second row, or the band-shaped paper white patches 72 disposed in the paper white regions A10 to A18 of the fourth row. That is, in the test pattern 70A, the colorimetry of the paper white patch 72 is performed in a wide range and it is possible to acquire the measurement value of the averaged paper white patch 72 compared to the test pattern 70 described above. As a result, it is possible to reduce the influence of the paper white patch 72 which is not preferable for correcting the measurement value of the evaluation patch 71.

For example, in a case where variation of the measurement position of the paper white patch 72 is large in the X direction, it is preferable that the shape of the paper white patch 72 is long in the X direction. In a case where variation of the measurement position of the paper white patch 72 is large in the Y direction, it is preferable that the shape of the paper white patch 72 is long in the Y direction.

The invention is not limited to the above-described embodiments, but can be properly changed within a scope not contrary to the gist or idea of the invention which can be read from the appended claims and the entire specification, and various modifications other than the above-described embodiments are conceivable. Hereinafter, modification examples will be described.

MODIFICATION EXAMPLE 1

In each of the embodiments, a configuration, in which the medium 8 is an opaque member or a translucent member and the light reflected by the medium 8 is incident on the measurement portion 172, is exemplified, but the invention is not limited thereto. In a case where the medium 8 of a transparent member is measured, or in a case where a transmission light transmitting a translucent member is measured, the light source portion 171 or the measurement portion 172 may be provided on a platen 122 side. However, in this case, it is necessary to have a configuration for moving the light source portion 171 or the measurement portion 172 provided on the platen 122 side in the movement direction of the carriage 13 together with the movement of the carriage 13.

MODIFICATION EXAMPLE 2

In the embodiments, as the wavelength variable interference filter 5, a light transmission-type wavelength variable interference filter 5, which transmits a light of wavelength corresponding to the gap G between the reflection films 54 and 55 from the incident light, is exemplified, but the invention is not limited thereto. For example, a light reflection-type wavelength variable interference filter, which reflects a light of a wavelength corresponding to the gap G between the reflection films 54 and 55, may be used. In addition, a wavelength variable interference filter of another type may also be used.

In addition, as the spectroscope, the wavelength variable interference filter 5 is exemplified, but the invention is not limited thereto. As the spectroscope, for example, a grating, an AOTF, an LCTF, or the like may be used.

MODIFICATION EXAMPLE 3

In the above-described embodiments, the printer 10 including the measuring device 17 is exemplified, but the invention is not limited thereto. For example, a measuring device that performs only the colorimetry process with respect to the medium 8 may be provided. Further, the measuring device of the invention may be incorporated in a quality inspection apparatus that performs quality inspection of a printed matter which is manufactured in, for example, a manufacturing factory, or the measuring device according to the invention may be incorporated in any apparatus.

The entire disclosure of Japanese Patent Application No. 2016-190768 filed on Sep. 29, 2016 is expressly incorporated by reference herein.

What is claimed is:

1. A measuring device that measures colors of an evaluation patch formed in a measuring object and a paper white patch which is a portion that the measuring object is exposed, the device comprising:
    a light source that irradiates the measuring object with an illumination light;
    a measurement portion that acquires an amount of light from the measuring object as a measurement value;
    a storage portion that holds a paper white standard value that is a reference measurement value of the paper white patch; and
    a correction portion that corrects the measurement value of the evaluation patch based on the measurement value of the paper white patch and the paper white standard value.

2. The measuring device according to claim 1, further comprising:
    a standard white plate,
    wherein the storage portion further holds a standard white value that is the reference measurement value of the standard white plate, and
    wherein the correction portion corrects the measurement value of the evaluation patch based on the measurement value of the standard white plate and the standard white value.

3. The measuring device according to claim 1, further comprising:

a carriage on which the light source and the measurement portion are mounted, and which is movable relative to the measuring object, wherein the measurement value of the paper white patch and the measurement value of the evaluation patch are acquired while the carriage moves relative to the measuring object.

4. The measuring device according to claim 1, wherein the measurement portion has a spectroscope, and wherein the spectroscope is a transmissive wavelength variable Fabry-Perot etalon.

5. The measuring device according to claim 1, wherein the storage portion holds the paper white standard value for each type of measuring objects.

6. The measuring device according to claim 1, wherein the measuring object has a plurality of paper white patches, and wherein the correction portion corrects the measurement value of the evaluation patch using the measurement value of the paper white patch positioned at a position adjacent to the evaluation patch among the plurality of paper white patches.

7. The measuring device according to claim 6, wherein in a case where the plurality of paper white patches are present at positions adjacent to the evaluation patch, the correction portion corrects the measurement value of the evaluation patch using an average value of the measurement values of the plurality of paper white patches at positions adjacent to the evaluation patch.

8. A measuring method of a measuring device having a light source that irradiates a measuring object having an evaluation patch and a paper white patch with an illumination light, a measurement portion that acquires an amount of the illumination light reflected by the measuring object as a measurement value, a carriage on which the light source and the measurement portion are mounted, and which is movable relative to the measuring object, a storage portion that holds a paper white standard value, and a correction portion that corrects the measurement value of the evaluation patch, the method comprising:

acquiring the measurement value of the evaluation patch while the carriage moves relative to the measuring object;

acquiring the measurement value of the paper white patch while the carriage moves relative to the measuring object; and correcting the measurement value of the evaluation patch based on the measurement value of the paper white patch and the paper white standard value.

9. The measuring method of a measuring device according to claim 8, wherein the storage portion further holds a standard white value that is a reference measurement value of a standard white plate, and the method further comprising:

acquiring the measurement value of the standard white plate; and correcting the measurement value of the evaluation patch based on the measurement value of the standard white plate and the standard white value.

* * * * *